US012756483B2

(12) United States Patent
Kawamura et al.

(10) Patent No.: US 12,756,483 B2
(45) Date of Patent: Oct. 6, 2026

(54) COMMUNICATION DEVICE AND COMMUNICATION SYSTEM

(71) Applicant: Sony Group Corporation, Tokyo (JP)

(72) Inventors: Takashi Kawamura, Tokyo (JP); Takuma Matsushita, Tokyo (JP); Toshinori Kondo, Tokyo (JP); Futoshi Takeuchi, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 311 days.

(21) Appl. No.: 18/567,798

(22) PCT Filed: Feb. 15, 2022

(86) PCT No.: PCT/JP2022/005798
§ 371 (c)(1),
(2) Date: Dec. 7, 2023

(87) PCT Pub. No.: WO2022/264510
PCT Pub. Date: Dec. 22, 2022

(65) Prior Publication Data
US 2024/0283547 A1 Aug. 22, 2024

(30) Foreign Application Priority Data
Jun. 17, 2021 (JP) ................................ 2021-100681

(51) Int. Cl.
*H04B 13/02* (2006.01)

(52) U.S. Cl.
CPC .................................. *H04B 13/02* (2013.01)

(58) Field of Classification Search
None
See application file for complete search history.

(56) References Cited

U.S. PATENT DOCUMENTS 5,579,285 A * 11/1996 Hubert .................... G01S 19/18 367/133
7,069,053 B2 * 6/2006 Johannisson ............ H01Q 3/40 455/562.1

(Continued)

FOREIGN PATENT DOCUMENTS

JP H10-004313 A 1/1998
JP 2009-302963 A 12/2009

(Continued)

OTHER PUBLICATIONS

International Search Report and Written Opinion mailed on May 17, 2022, received for PCT Application PCT/JP2022/005798, filed on Feb. 15, 2022, 8 pages including English Translation.

*Primary Examiner* — Tuan A Tran
(74) *Attorney, Agent, or Firm* — XSENSUS LLP

(57) ABSTRACT

A communication device that includes a first antenna connected to a communication network in a liquid, and a first signal processing circuit that processes at least one of a signal received by the first antenna or a signal transmitted by the first antenna, in which the first antenna is a circularly polarized antenna. The communication device further includes a second antenna connected to a communication network in a gas, and a second signal processing circuit that processes at least one of a signal received by the second antenna or a signal transmitted by the second antenna are further included. The present technology can be applied to, for example, a communication device installed in sea water.

10 Claims, 20 Drawing Sheets

(56) References Cited

U.S. PATENT DOCUMENTS

| | | | | | |
|---|---|---|---|---|---|
| 7,236,807 | B1 * | 6/2007 | Shapira | H01Q 1/246 455/562.1 |
| 8,102,733 | B2 * | 1/2012 | Rapp | H04B 11/00 367/134 |
| 9,118,407 | B2 * | 8/2015 | Imran | G05D 1/0208 |
| 9,213,077 | B2 * | 12/2015 | Kieffer | B63B 22/00 |
| 9,270,387 | B2 * | 2/2016 | Wolfe | H04B 13/02 |
| 9,337,916 | B2 * | 5/2016 | Ahn | H04B 7/10 |
| 9,432,129 | B2 * | 8/2016 | Gosling | G01S 19/14 |
| 9,560,533 | B2 * | 1/2017 | Nilsson | H04B 7/0413 |
| 9,979,089 | B2 * | 5/2018 | Koskiniemi | H01Q 9/285 |
| 10,887,087 | B2 * | 1/2021 | Viswanathan | B63G 8/001 |
| 2020/0177221 | A1 * | 6/2020 | Gardner | H01Q 9/0407 |

FOREIGN PATENT DOCUMENTS

| | | | |
|---|---|---|---|
| JP | 2010-021874 | A | 1/2010 |
| JP | 2012-253695 | A | 12/2012 |

* cited by examiner

COMMUNICATION DEVICE AND COMMUNICATION SYSTEM

CROSS-REFERENCE TO RELATED APPLICATIONS

The present application is based on PCT filing PCT/JP2022/005798, filed Feb. 15, 2022, which claims priority from Japanese Patent Application No. 2021-100681, filed Jun. 17, 2021, the entire contents of each are incorporated herein by reference.

TECHNICAL FIELD

The present technology relates to a communication device and a communication system and relates to, for example, a communication device and a communication system suitable for use in communication in a liquid.

BACKGROUND ART

In recent years, wireless communication such as wireless local area network (LAN) and non-contact communication has been widely spread. Patent Document 1 proposes a communication device that communicates with a communication device that is isolated underwater.

CITATION LIST

Patent Document

Patent Document 1: Japanese Patent Application Laid-Open No. 2010-21874

SUMMARY OF THE INVENTION

Problems to be Solved by the Invention

In a communication device installed underwater, for example, in the sea, the posture becomes unstable due to the influence of waves or the like, the orientation of the antenna changes, and there is a possibility that good transmission and reception cannot be performed. It is desired to enable stable communication even in a situation where the attitude of the communication device becomes unstable.

The present technology has been made in view of such a situation, and enables stable communication.

Solutions to Problems

A communication device according to one aspect of the present technology is a communication device including a first antenna connected to a communication network in a liquid, and a first signal processing unit that processes at least one of a signal received by the first antenna or a signal transmitted by the first antenna, in which the first antenna is a circularly polarized antenna.

A communication system according to one aspect of the present technology is a communication system including a first communication device and a second communication device, in which the first communication device includes a first antenna connected to the second communication device in a liquid, and a first signal processing unit that processes a signal from the second communication device received by the first antenna, the second communication device includes a second antenna connected to the first communication device in a liquid, and a second signal processing unit that processes a signal to be transmitted to the first communication device by the second antenna, the first antenna is a circularly polarized antenna, and the second antenna is a circularly polarized or linearly polarized antenna.

A communication device according to one aspect of the present technology includes an antenna connected to a communication network in a liquid, and a signal processing unit that processes at least one of a signal received by the antenna or a signal transmitted by the antenna. The antenna is a circularly polarized antenna.

The communication system according to one aspect of the present technology includes a first communication device and a second communication device. The first communication device includes a first antenna connected to the second communication device in liquid, and a first signal processing unit that processes a signal from the second communication device received by the first antenna. The second communication device includes a second antenna connected to the first communication device in the liquid, and a second signal processing unit that processes a signal to be transmitted to the first communication device by the second antenna. The first antenna is a circularly polarized antenna, and the second antenna is a circularly polarized or linearly polarized antenna.

Note that the communication device may be an independent device or an internal block constituting one device.

MODE FOR CARRYING OUT THE INVENTION

Hereinafter, modes for carrying out the present technology (hereinafter referred to as embodiments) will be described.

<Configuration of Communication System>

Figure 1:
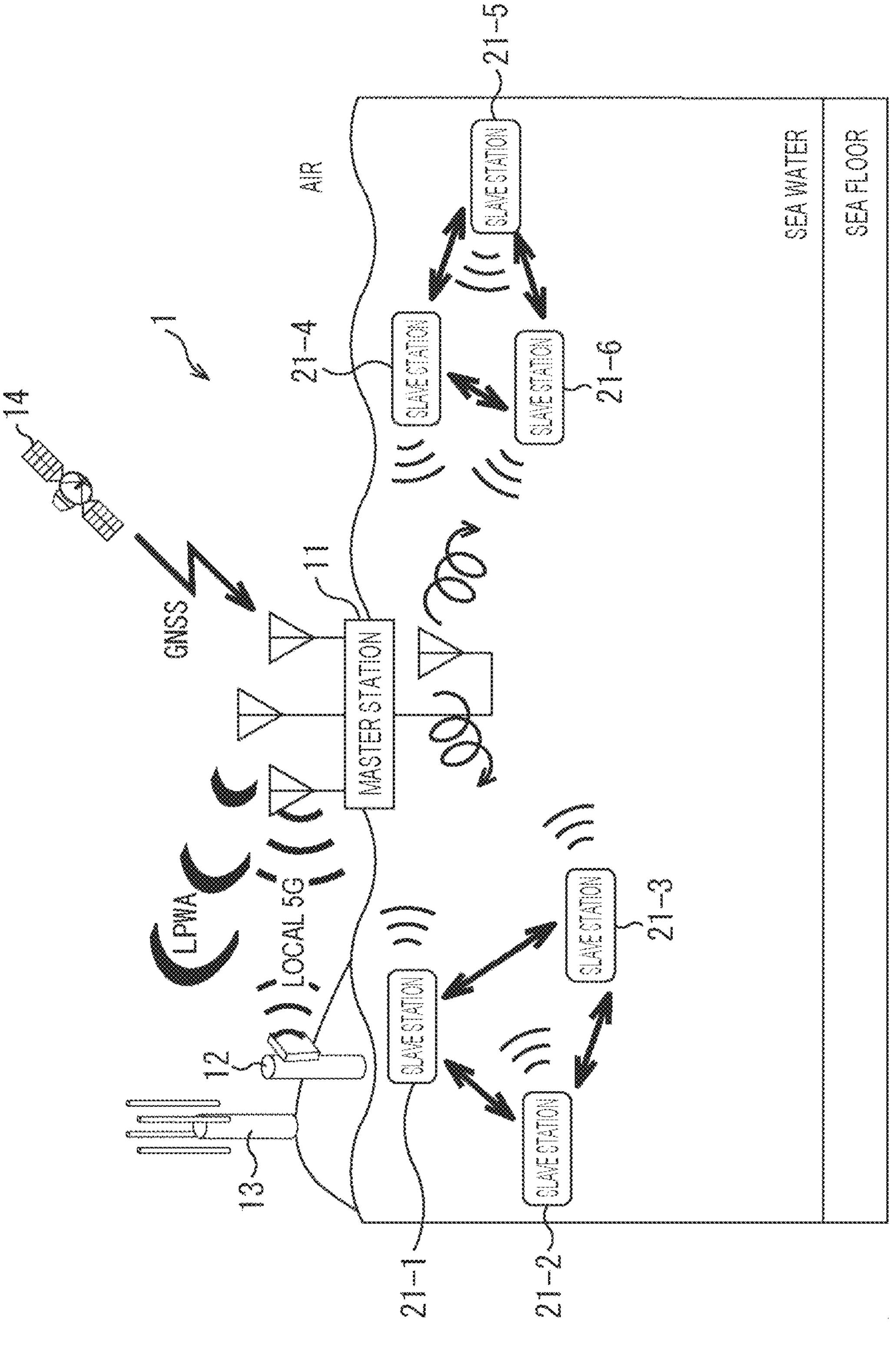
FIG. 1 is a diagram illustrating a configuration of an embodiment of a communication system to which the present technology is applied.

FIG. 1 is a diagram illustrating a configuration of an embodiment of a communication system 1 to which the present technology is applied. A communication system 1 illustrated in FIG. 1 includes a master station 11, a communication station 12, a communication station 13, a satellite 14, and slave stations 21-1 to 21-6. In the following description, in a case where it is not necessary to individually distinguish the slave stations 21-1 to 21-6, they are simply described as the slave station 21-1.

The master station 11 and the communication station 12 perform communication using a local 5G, for example. The master station 11 and the communication station 13 perform communication using, for example, low power wide area (LPWA). The master station 11 is capable of acquiring position information from the satellite 14 using, for example, a global navigation satellite system (GNSS). Here, the description will be continued with examples of the local 5G, the LPWA, and the GNSS, but it is also possible to configure such that communication using another communication network, for example, a wireless local area network (WLAN), a satellite communication network, or the like is performed.

The master station 11 also communicates with the slave station 21. In the master station 11, a portion that communicates with the communication station 12, the communication station 13, and the satellite 14 described above is located in the air, and a portion that communicates with the slave station 21 is located in sea water. The slave station 21 is located in the sea water.

Note that, here, a case where the environment in which the communication system 1 is installed is the sea will be described as an example, but the communication system 1 may be installed in an environment such as a lake, a pond, a river, or a water tank. Here, a description will be given assuming that one of the master stations 11 is located in the air (in gas) and the other is located in sea water (in liquid), but the master station 11 may be such that one is located on the sea floor (in solid) or in vacuum.

The configuration of the communication system 1 illustrated in FIG. 1 is an example, and is not described as a limitation. In the communication system 1 illustrated in FIG. 1, an example in which the master station 11 communicates with the communication station 12, the communication station 13, and the satellite 14 is illustrated, but the master station may further have a function of communicating with other than these, or may not have a function of being able to communicate with all of these, and may be capable of communicating with any one or two of them. The master station 11 may have only a function of communicating with the slave station 21, in other words, may not have a function of communicating with the communication station 12, the communication station 13, or the satellite 14.

The slave station 21 communicates with the master station 11. What is called an ad-hoc network in which the slave stations 21 communicate with each other may be configured. The slave station 21 includes, for example, a sensor (described later) that senses the inside of the sea, and transmits sensed data to the master station 11. The slave station 21 can have only a transmission function of transmitting data to the master station 11, or can have a transmission function and a reception function of transmitting and receiving data to and from the master station 11 and another slave station 21.

<Positional Relationship of Communication System>

Figure 2:
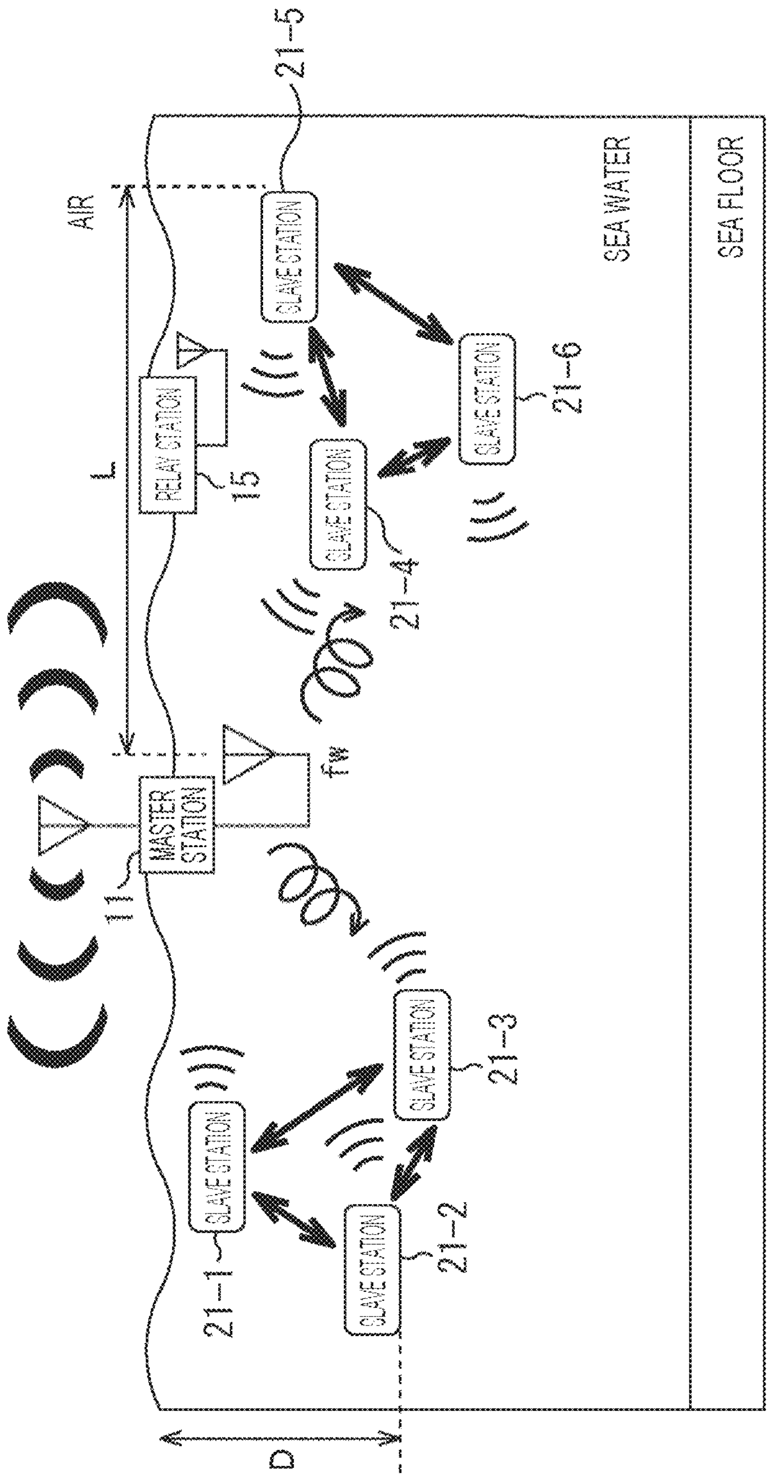
FIG. 2 is a diagram for describing a positional relationship between a master station and a slave station.

An example of a positional relationship of the communication system 1 will be described with reference to FIG. 2. The communicable range between the master station 11 and the slave station 21 can be set such that a radius L is, for example, 50 m or less in a circle centered on the master station 11. In the example illustrated in FIG. 2, the slave stations 21 located within the circle with the radius L centered on the master station 11 are the slave stations 21-1 to 21-6, and the master station 11 can communicate with each of the slave stations 21-1 to 21-6.

In order to increase the radius L, or in a case where a signal from the slave station 21 is weak or in order to enable the master station 11 to reliably receive a signal from the slave station 21 located at a distant position, a relay station 15 may be provided in the communication system 1. The relay station 15 has a function of amplifying a signal from the slave station 21 and transmitting the signal to the master station 11. The relay station 15 can be configured not to have a function of performing modulation and demodulation. The relay station 15 includes, for example, a transmission antenna and a reception antenna near the sea surface, for example, within a depth of 2 m from the sea surface, or includes a transmission-reception shared antenna.

The slave station 21 is installed, for example, within a range of a depth D from the sea surface of 0 to 10 m. As described above, the slave station 21 may be configured by one-way communication or two-way communication. In a case of bidirectional communication, communication between the slave stations 21 is also enabled, so that what is called an ad-hoc network can be formed, and the communication range can be expanded.

An operating frequency fw between the master station 11 and the slave station 21 is set to, for example, 1 MHz or less. An operating frequency fg in a case where the master station 11 communicates with, for example, the communication station 12 on the land is set to a frequency higher than the operating frequency fw. In other words, the operating frequency fw is set to a frequency satisfying the relationship of the operating frequency fw<the operating frequency fg.

Note that the operating frequency, the depth from the sea surface, and the like are examples, and are not descriptions indicating limitations. For example, if the frequencies are different, it is also possible to increase the depth from the sea surface.

<Signal Propagation>

Figure 3:
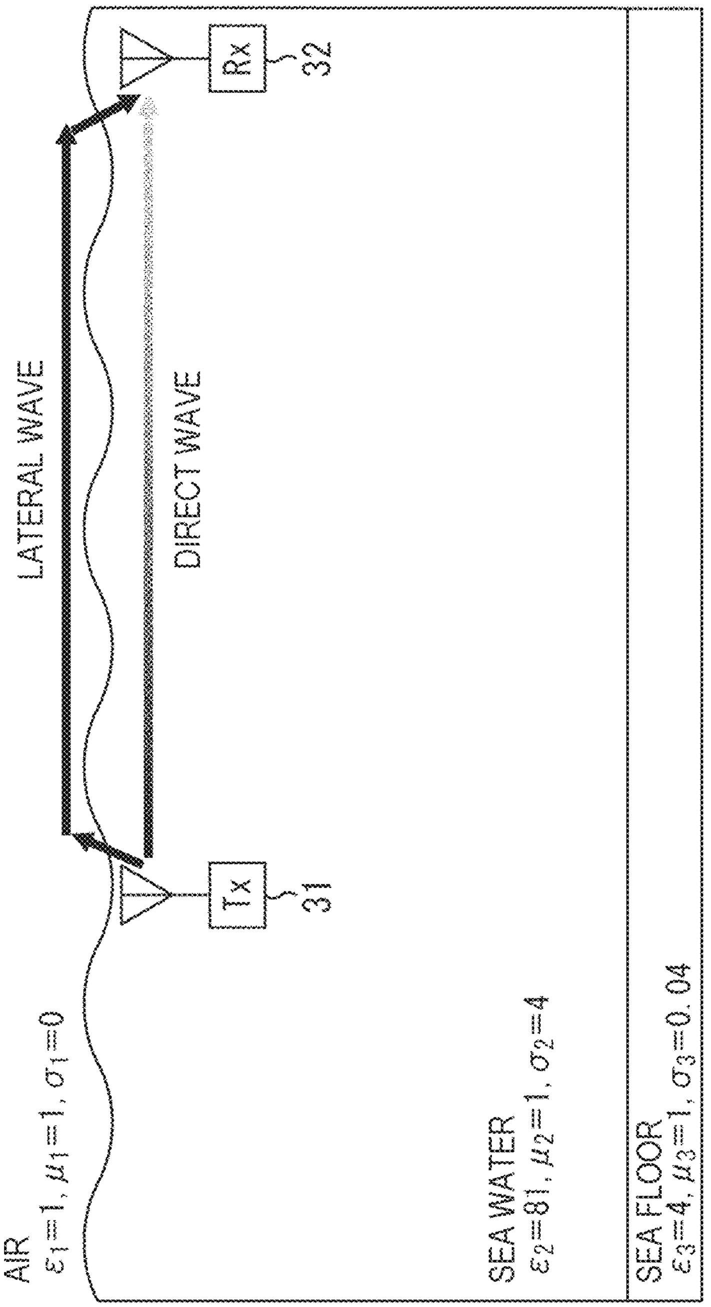
FIG. 3 is a diagram for describing a direct wave and a lateral wave.

With reference to FIG. 3, propagation of a signal in general water will be described. FIG. 3 illustrates a transmitter 31 and a receiver 32. The transmitter 31 and the receiver 32 correspond to the master station 11, the relay station 15, or the slave station 21.

As a path through which the signal from the transmitter 31 is propagated to the receiver 32, there are a direct wave that linearly advances between the antenna of the transmitter 31 and the antenna of the receiver 32, and a lateral wave that advances vertically upward from the antenna of the transmitter 31 to the sea surface immediately above the antenna, exits to the sea surface, advances along the sea surface, and advances from the sea surface to the antenna of the receiver 32 immediately above the antenna of the receiver 32.

When the attenuation received by the lateral wave is smaller than the attenuation received by the direct wave, the lateral wave becomes dominant and is received by the receiver 32. The lateral wave propagates farther than the direct wave, and thus the lateral wave becomes dominant as the distance between the transmitter 31 and the receiver 32 increases. Such a phenomenon occurs where the antenna is not far away from the sea surface.

As described with reference to FIG. 2, by setting the depth D from the sea surface to, for example, 10 m or less and positioning the slave station 21 between the sea surface and the depth D, communication using the lateral wave can be used, and communication can be performed even in a case where the distance between the master station 11 and the slave station 21 is increased.

Here, the description will be continued assuming that the master station 11 and the slave station 21, the master stations 11, the master station 11 and the relay station 15, and the slave stations 21 are within a range in which communication using a direct wave and a lateral wave can be performed. In the following description, as illustrated in FIG. 3, relative permittivity $\varepsilon 1=1$, relative permeability $\mu 1=1$, and electrical conductivity $\sigma 1=0$ in the air, relative permittivity $\varepsilon 2=81$, relative permeability $\mu 2=1$, and electrical conductivity $\sigma 2=2$ in the sea water, and relative permittivity $\varepsilon 3=4$, relative permeability $\mu 3=1$, and electrical conductivity $\sigma 3=0.04$ on the sea floor will be described as an example.

<Configuration Example of Master Station>

Figure 4:
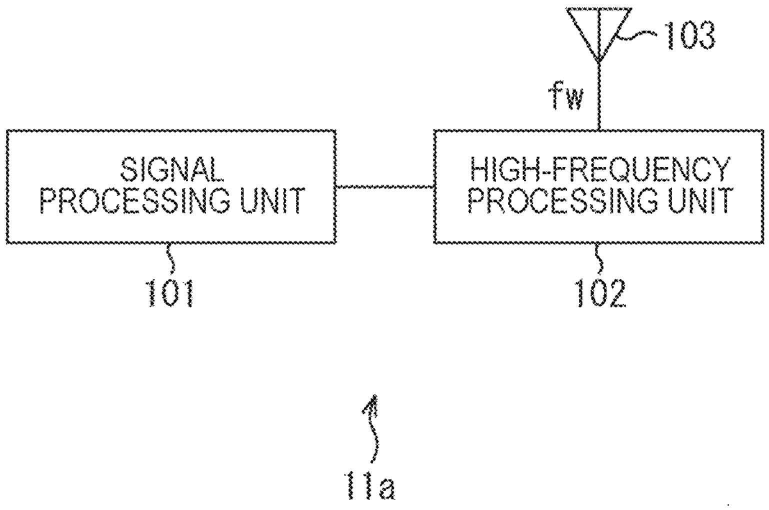
FIG. 4 is a diagram illustrating a configuration example of the master station.

FIG. 4 is a diagram illustrating a configuration example of the master station 11. The master station 11*a* illustrated in FIG. 4 includes a signal processing unit 101, a high-frequency processing unit 102, and an antenna 103. The antenna 103 of the master station 11*a* is installed in the sea water (liquid), and is used for communication with the slave station 21, the relay station 15, and another master station 11 installed in the sea water. Although details will be described later, the antenna 103 is a circularly polarized antenna.

The signal from the slave station 21 is received by the antenna 103 of the master station 11 and supplied to the high-frequency processing unit 102. The high-frequency processing unit 102 is configured to process a received signal as described with reference to FIG. 8, or configured to process a received signal and a signal to be transmitted as described with reference to FIG. 9. The operating frequency fw of the high-frequency processing unit 102 is set to, for example, 1 MHz or less.

The signal processed by the high-frequency processing unit 102 is supplied to the signal processing unit 101. For example, the signal processing unit 101 performs processing in a case where the signal processed by the high-frequency processing unit 102 is temporarily stored or the received signal is processed and transmitted.

The configuration of the master station 11*a* illustrated in FIG. 4 can also be applied as a configuration of the relay station 15. In a case where the configuration illustrated in FIG. 4 is the configuration of the relay station 15, the antenna 103 has a function of receiving a signal from the slave station 21 and a function of transmitting a signal to the master station 11 or another relay station 15. The high-frequency processing unit 102 and the signal processing unit 101 have a function of amplifying and transmitting a received signal.

Figure 5:
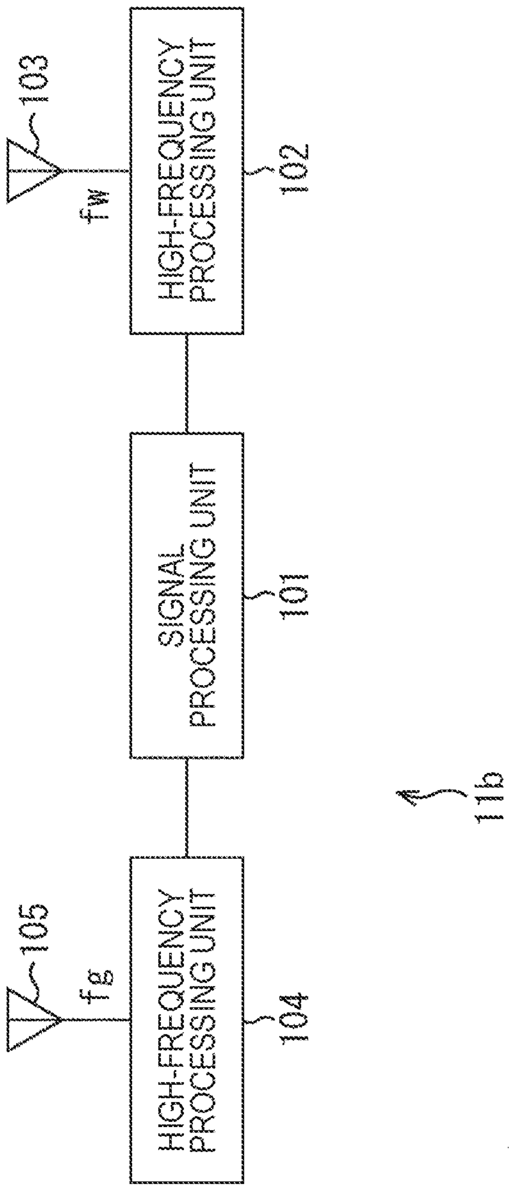
FIG. 5 is a diagram illustrating another configuration example of the master station.

FIG. 5 is a diagram illustrating another configuration example of the master station 11. The master station 11*b* illustrated in FIG. 5 has a configuration in which a high-frequency processing unit 104 and an antenna 105 are added to the master station 11*a* illustrated in FIG. 4. The antenna 105 is installed in the air, and is used to communicate with the communication station 12 and the communication station 13 installed on land, the satellite 14 installed in vacuum, and the like.

For example, a signal from the communication station 13 is received by the antenna 105 of the master station 11 and supplied to the high-frequency processing unit 104. The high-frequency processing unit 104 is also supplied with a signal processed by the signal processing unit 101, for example, a signal to be transmitted to the communication station 13. The high-frequency processing unit 104 processes a received signal or a signal to be transmitted. The operating frequency fg of the high-frequency processing unit 104 is set to a frequency larger than the operating frequency fw of the high-frequency processing unit 102, for example.

The signal processing unit 101 executes processing of converting a signal from the high-frequency processing unit 102 constituting an underwater communication system into a signal to the high-frequency processing unit 104 constituting an aerial communication system. That is, the signal processing unit 101 performs processing of bridging the underwater communication system and a land-based communication system, for example, processing such as frequency conversion.

In a case where it is configured to transmit a signal from the master station 11 to the slave station 21, for example, when an instruction from the communication station 13 to the slave station 21 is transmitted via the master station 11, the signal processing unit 101 also executes processing of converting the signal from the high-frequency processing unit 104 into a signal to the high-frequency processing unit 102.

The configuration of the master station 11*b* illustrated in FIG. 5 can also be applied as the configuration of the relay station 15. In a case where the configuration illustrated in FIG. 5 is the configuration of the relay station 15, the antenna 103 has a function of receiving a signal from the slave station 21 and a function of transmitting a signal to the master station 11 or another relay station 15. The function of transmitting a signal to the master station 11 or another relay station 15 may be provided in the antenna 105.

The high-frequency processing unit 102 and the signal processing unit 101 have a function of amplifying and transmitting a received signal. Alternatively, the high-frequency processing unit 102 and the signal processing unit 101 may amplify the received signal, and the signal processing unit 101 and the high-frequency processing unit 104 may have a function of transmitting the amplified signal.

Figure 6:
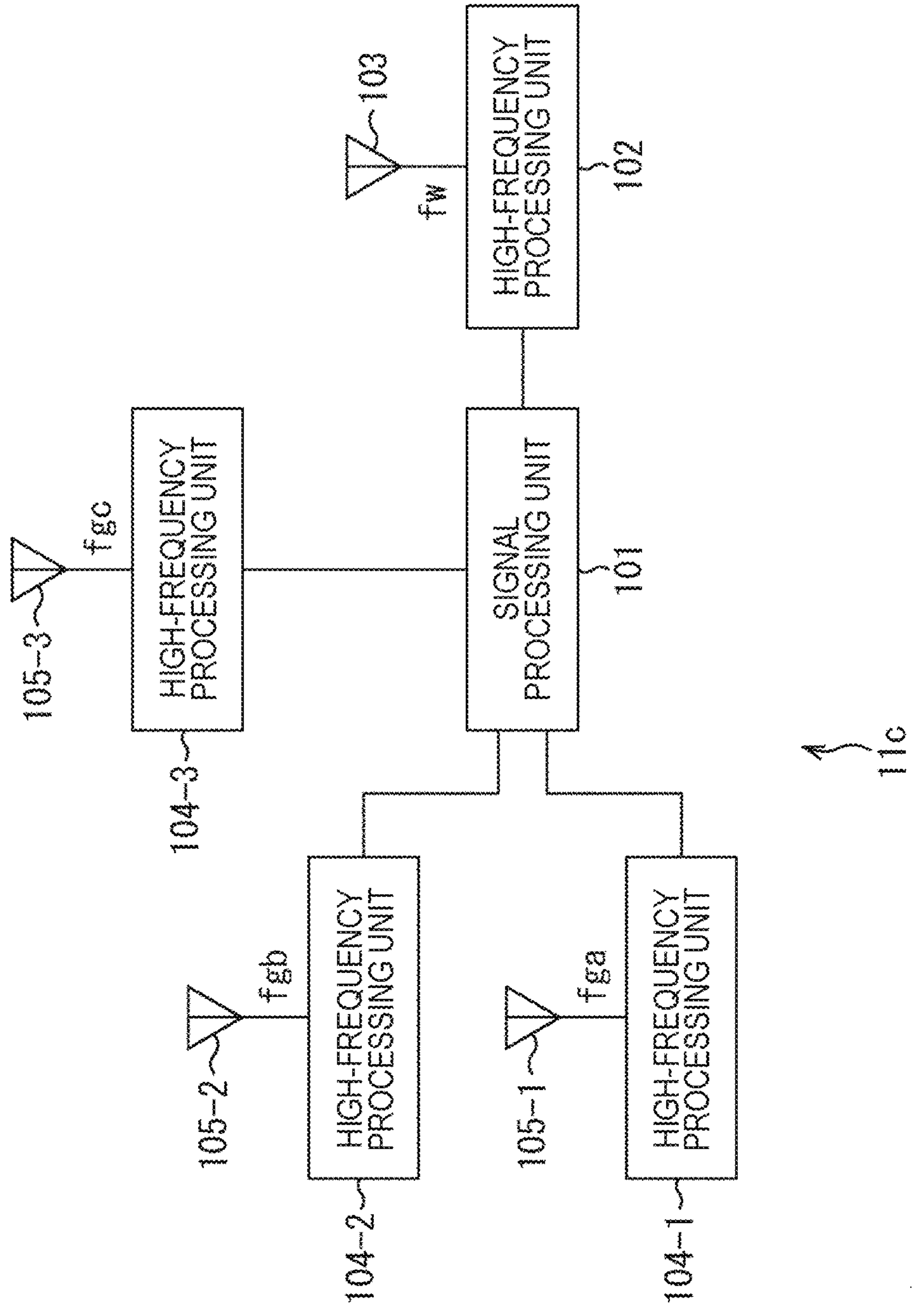
FIG. 6 is a diagram illustrating another configuration example of the master station.

FIG. 6 is a diagram illustrating still another configuration example of the master station 11. As described with reference to FIG. 1, in a case where the master station 11 communicates with the communication station 12, the communication station 13, and the satellite 14, the master station 11 includes an antenna or a high-frequency processing unit corresponding to each communication as illustrated in FIG. 6. The master station 11*c* illustrated in FIG. 6 includes high-frequency processing units 104-1 to 104-3 and antennas 105-1 to 105-3.

The high-frequency processing unit 104-1 and the antenna 105-1 operate, for example, at an operating frequency fga, and receive a signal from the communication station 12 or transmit a signal to the communication station 12. The high-frequency processing unit 104-2 and the antenna 105-2 operate, for example, at an operating frequency fgb, and receive a signal from the communication station 13 or transmit a signal to the communication station 13. The high-frequency processing unit 104-3 and the antenna 105-3 operate, for example, at an operating frequency fgc, and receive a signal from the satellite 14 or transmit a signal to the satellite 14.

<Configuration of Slave Station>

Figure 7:
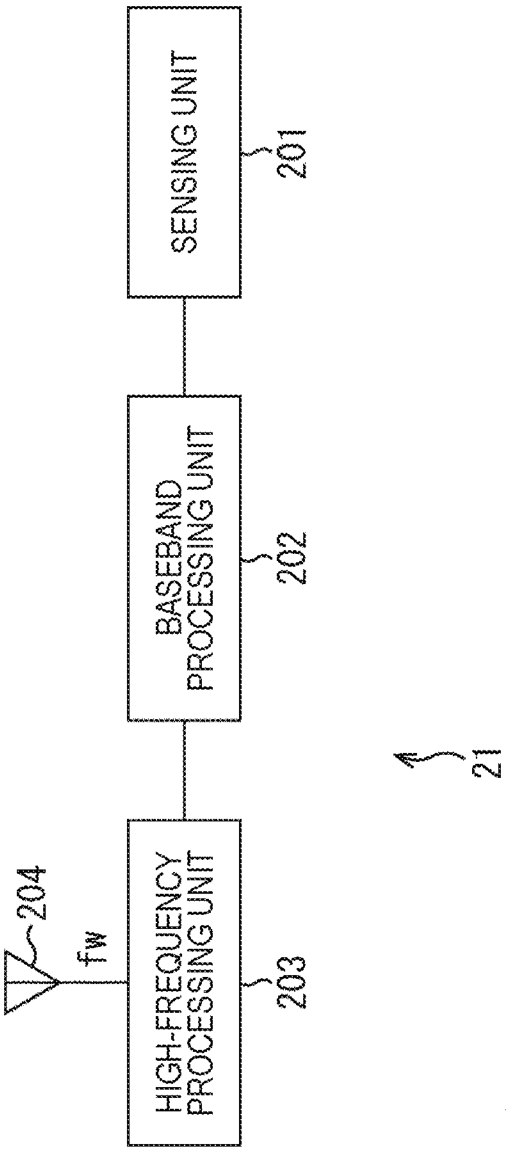
FIG. 7 is a diagram illustrating a configuration example of the slave station.

FIG. 7 is a diagram illustrating a configuration example of the slave station 21. The slave station 21 includes a sensing unit 201, a baseband processing unit 202, a high-frequency processing unit 203, and an antenna 204.

The slave station 21 can be a mobile station such as an underwater drone or a robot arranged underwater. The slave station 21 includes, for example, a sensor that observes water temperature, tidal current, and the like, an image sensor, and the like in the sensing unit 201, and can be installed at a specific position.

The data sensed by the sensing unit 201 is supplied to the baseband processing unit 202. The baseband processing unit 202 uses the supplied data as a baseband signal, performs necessary processing on the baseband signal, and supplies the baseband signal to the high-frequency processing unit 203. The high-frequency processing unit 203 operates, for example, at the operating frequency fw, performs frequency conversion into a signal of the frequency fw, and transmits the signal from the antenna 204 to the master station 11.

The high-frequency processing unit 203 is configured to process a received signal as described with reference to FIG. 8, or configured to process a received signal and a signal to be transmitted as described with reference to FIG. 9. The operating frequency fw of the high-frequency processing unit 203 is set to, for example, 1 MHz or less.

The slave station 21 can be configured to perform transmission and reception with the master station 11 or can be configured to transmit data to the master station 11. The antenna 204 of the slave station 21 only needs to have a function capable of being connected to the master station 11 so as to be able to exchange data. Although details will be described later, the antenna 204 is a circularly polarized antenna or a linearly polarized antenna. The transmission of the signal from the slave station 21 may be intermittent transmission.

<Configuration of High-Frequency Processing Unit in First Embodiment>

Figure 8:
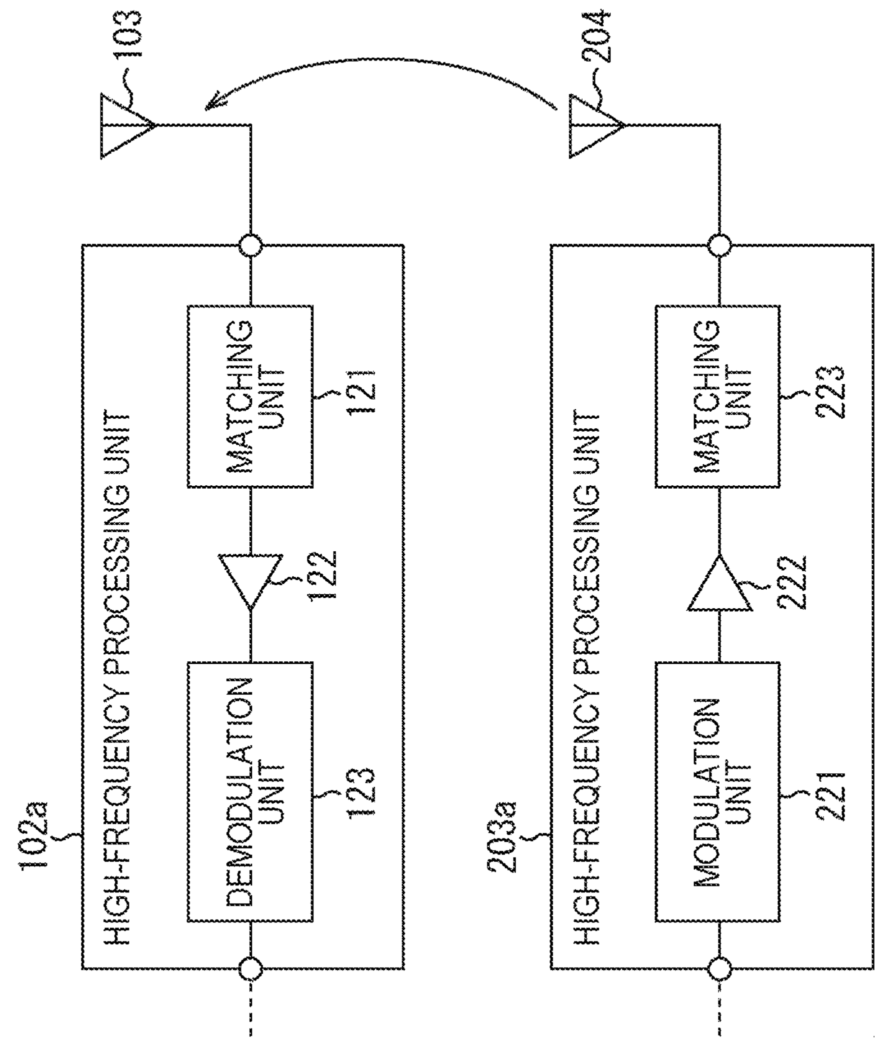
FIG. 8 is a diagram illustrating a configuration example of a high-frequency processing unit.

The upper diagram of FIG. 8 is a diagram illustrating a configuration example of a high-frequency processing unit 102*a* in the first embodiment of the master stations 11*a* to 11*c* illustrated in FIGS. 4 to 6. The lower diagram of FIG. 8 is a diagram illustrating a configuration example of a high-frequency processing unit 203*a* in the first embodiment of the slave station 21 illustrated in FIG. 7. The high-frequency processing unit 102*a* and the high-frequency processing unit 203*a* illustrated in FIG. 8 have a configuration in which the master station 11 receives a signal from the slave station 21, and are configuration examples in a case where the slave station 21 performs only uplink unidirectional communication.

The high-frequency processing unit 102*a* includes a matching unit 121, a high-frequency amplification unit 122, and a demodulation unit 123. The high-frequency processing unit 203*a* includes a modulation unit 221, a high-frequency amplification unit 222, and a matching unit 223.

Data obtained as a result of sensing by the sensing unit 201 (FIG. 7) of the slave station 21 is processed by the baseband processing unit 202 (FIG. 7) and supplied to the modulation unit 221 of the high-frequency processing unit 203*a*. The modulation unit 221 modulates the supplied baseband signal by a predetermined modulation method, and supplies the modulated baseband signal to the high-frequency amplification unit 222. The modulation unit 221 executes processing such as changing a baseband signal of a digital signal into an analog RF signal, for example. The high-frequency amplification unit 222 includes, for example, a power amplifier (PA), amplifies the supplied signal, and supplies the amplified signal to the matching unit 223.

The matching unit 223 executes processing of matching the impedance of the preceding stage of the matching unit 223 with the impedance of the antenna 204. The amplified signal is supplied to the antenna 204 via the matching unit 223 and radiated (transmitted) from the antenna 204.

The signal from the antenna 204 is received by the antenna 103 of the master station 11. The signal received by the antenna 103 is supplied to the matching unit 121 of the high-frequency processing unit 102*a*. The matching unit 121 executes processing of matching the impedance of the antenna 103 with the impedance of the subsequent stage of the matching unit 121. The signal received by the antenna 103 is supplied to the high-frequency amplification unit 122 via the matching unit 121.

The high-frequency amplification unit 122 includes, for example, a low noise amplifier (LNA), amplifies the supplied signal, and supplies the amplified signal to the demodulation unit 123. The demodulation unit 123 demodulates the supplied signal by a demodulation method corresponding to the modulation method of the modulation unit 221 of the slave station 21. The demodulation unit 123 executes processing such as changing an analog RF signal into a baseband signal of a digital signal, for example. The signal demodulated by the demodulation unit 123 is supplied to a signal processing unit 101 which is not illustrated in FIG. 8.

<Configuration of High-Frequency Processing Unit in Second Embodiment>

Figure 9:
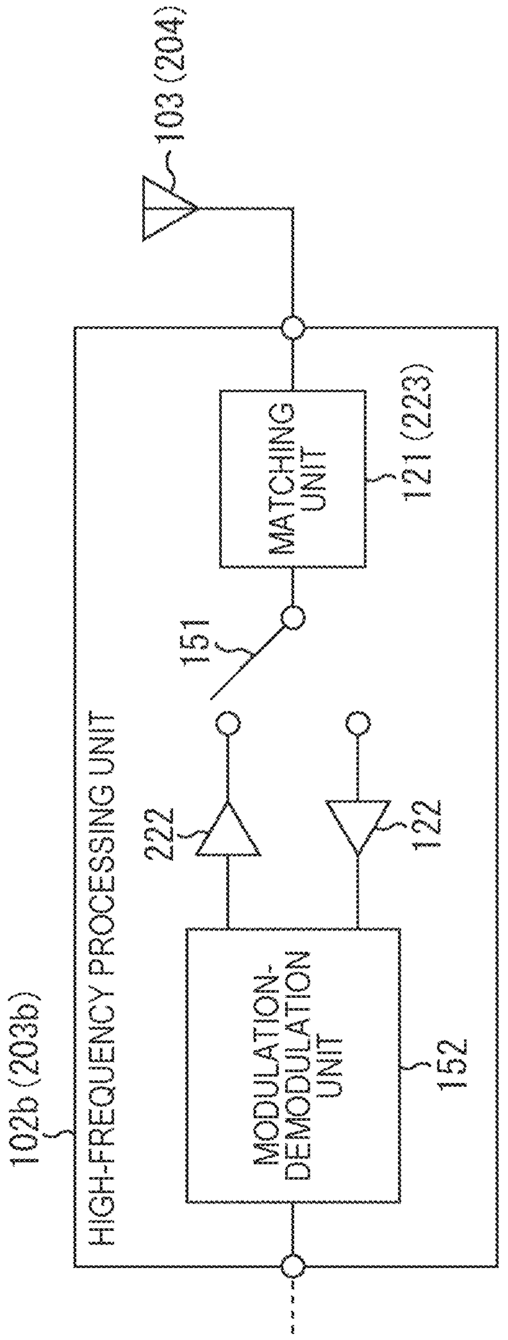
FIG. 9 is a diagram illustrating another configuration example of the high-frequency processing unit.

FIG. 9 is a diagram illustrating a configuration example (referred to as a second embodiment) of a high-frequency processing unit 102*b* and a high-frequency processing unit 203*b* in a case where communication between the master station 11 and the slave station 21 is performed bidirectionally. In a case where the communication between the master station 11 and the slave station 21 is performed bidirectionally, the high-frequency processing unit 104 of the master station 11 and the high-frequency processing unit 203*b* of the slave station 21 can have the same configuration. Here, the description will be continued using the configuration of the high-frequency processing unit 102*b* of the master station 11 as an example.

In the following description, the same portions as those of the high-frequency processing unit 102*a* or the high-frequency processing unit 203*a* illustrated in FIG. 8 are denoted by the same reference numerals, and description thereof is appropriately omitted.

The high-frequency processing unit 102*b* in a case of performing transmission and reception includes the matching unit 121, a transmission-reception switching unit 151, the high-frequency amplification unit 122, the high-frequency amplification unit 222, and a modulation-demodulation unit 152.

In a case where reception is performed by the antenna 103, the transmission-reception switching unit 151 is connected to the high-frequency amplification unit 122 side, and the modulation-demodulation unit 152 executes demodulation processing. In a case where transmission is performed by the antenna 103, the transmission-reception switching unit 151 is connected to the high-frequency amplification unit 222 side, and the modulation-demodulation unit 152 executes modulation processing.

As described above, in a case where transmission and reception are performed, a transmission antenna and a reception antenna may be separately provided.

Figure 10:
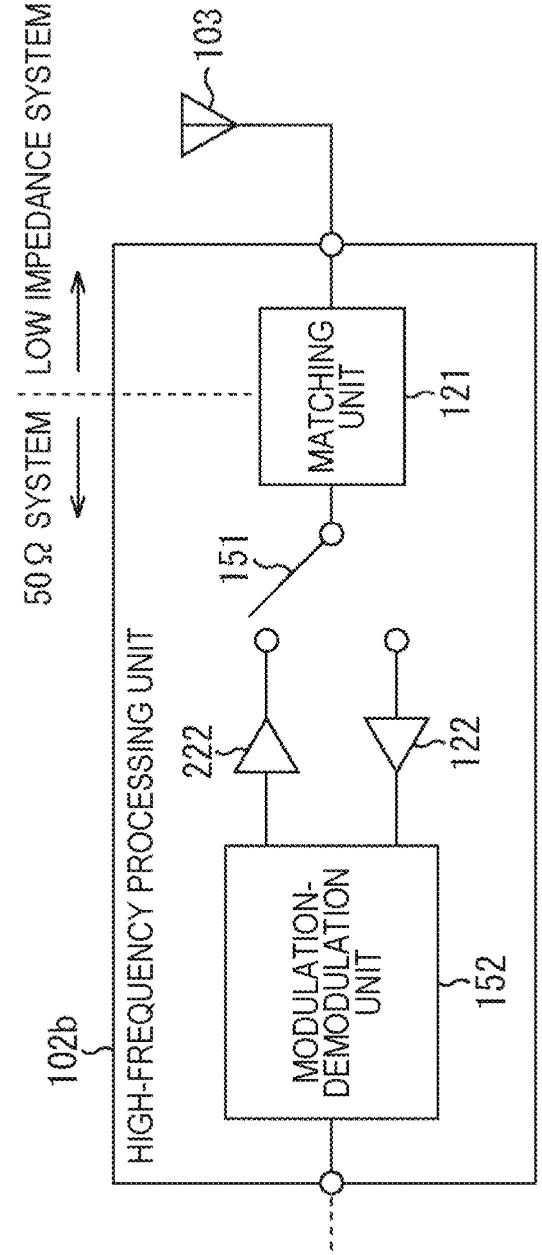
FIG. 10 is a diagram for describing impedance of the high-frequency processing unit.

By the way, since the antenna 103 is installed underwater, the antenna 103 side is a low impedance system as illustrated in FIG. 10. On the other hand, a side (left side in the drawing) of the matching unit 121 different from the side to which the antenna 103 is connected is generally designed with an impedance of about 50Ω.

An antenna included in a communication device used for land wireless communication has a role of impedance conversion between impedance of a power supply circuit and radiation impedance of vacuum. In this case, the impedance on the power supply circuit side is generally designed to be about 50Ω. The radiation impedance of the vacuum is designed to be about 377Ω. In a case where a matching unit (corresponding to the matching unit 121) included in a communication device used for land wireless communication is applied to the matching unit 121 of the master station 11 or the slave station 21 installed underwater, it is necessary to match an impedance of about 50Ω with a low impedance.

The reason why the antenna 103 side is a low impedance system is that the radiation impedance in water is about 42Ω, which is about ⅑ of the radiation impedance in vacuum.

In sea water having high conductivity, it can be assumed that the radiation impedance is further smaller than that in pure water. Thus, the input impedance of the antenna 103 installed under water can also be assumed to be ⅑ or less as compared with that in the air (in vacuum). If an antenna that operates at 50Ω on land is used in pure water, it can be assumed that the antenna operates at about 5.6Ω, and further operates at an impedance smaller than 5.6Ω in sea water.

In a case where the matching unit 121 included in the high-frequency processing unit 102*b* included in the master station 11 is designed to be similar to the matching unit included in the communication device used on land, there is a possibility that the impedance conversion ratio increases and the band becomes narrower in matching in the matching unit 121. Furthermore, there is a possibility that the loss increases due to the matching loss.

Accordingly, the antenna 103 may be designed to have a high impedance input so as to have a value close to the impedance of a general feeding circuit, and may have a structure that can be easily matched with a power supply circuit of a 50Ω system. In this manner, by designing the antenna 103 to have a high impedance input, the loss can be reduced and the band can be widened. In this manner, by designing the antenna 103 side and the power supply circuit side to have substantially the same impedance, the matching unit 121 can have a simplified configuration including only wire connection.

Alternatively, the impedance on the power supply circuit side may be designed to match the impedance of the antenna 103 installed underwater. The antenna 103 may be left as a low impedance system, and the power supply circuit side may be designed as a low impedance system. In this manner, by designing the antenna 103 side and the power supply circuit side to have substantially the same impedance, the matching unit 121 can have a simplified configuration including only wire connection.

In a case where the power supply circuit side is a low impedance system, the high-frequency amplification unit 122 and the high-frequency amplification unit 222 can be implemented by designing using a low impedance input/output device of 10Ω or less.

Figure 11:
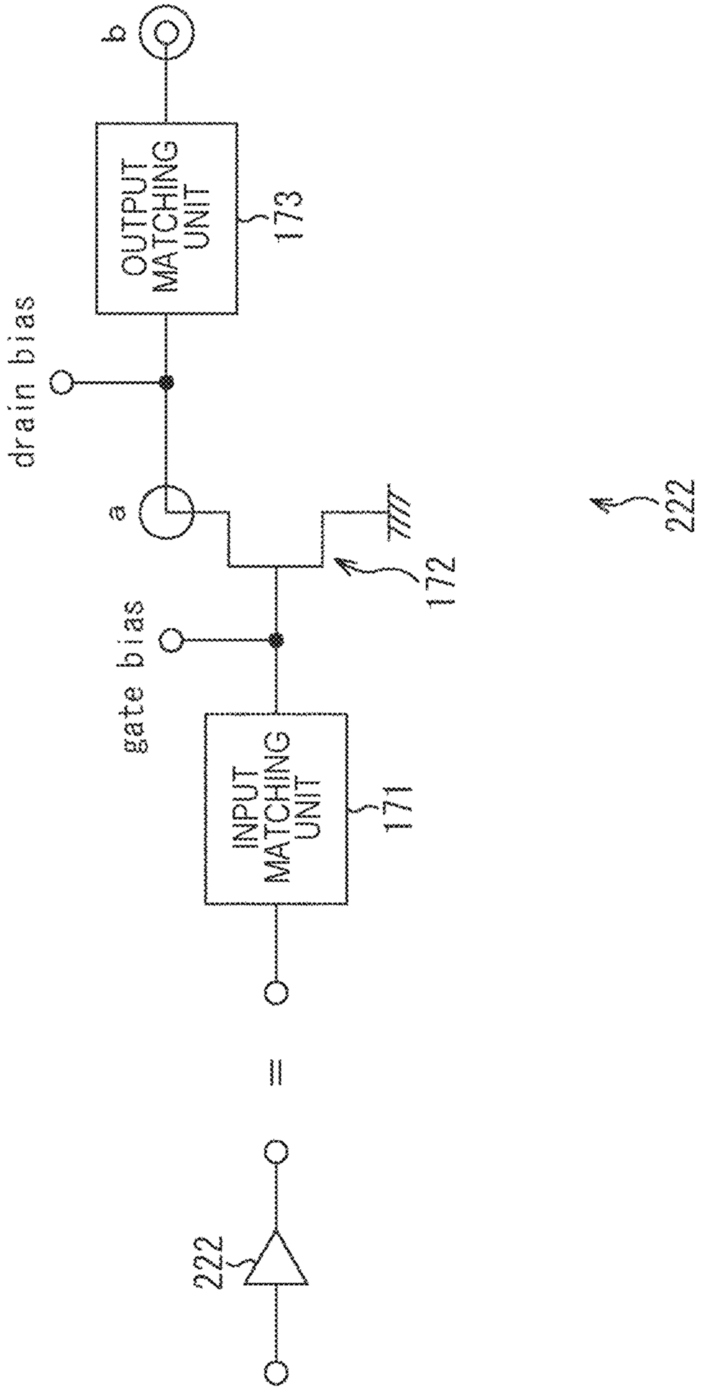
FIG. 11 is a diagram illustrating a configuration example of a high-frequency amplification unit.

Alternatively, the high-frequency amplification unit 122 and the high-frequency amplification unit 222 may be configured using transistors as illustrated in FIG. 11, and a low impedance power supply circuit may be configured. FIG. 11 is a diagram illustrating a configuration of an example of the high-frequency amplification unit 222.

The high-frequency amplification unit 222 includes an input matching unit 171, a field effect transistor (FET) 172, and an output matching unit 173. One end of the input matching unit 171 is connected to the modulation-demodulation unit 152 (FIG. 9), and the other end is connected to the gate of the FET 172. A drain of the FET 172 is connected to one end a of the output matching unit 173. The other end b of the output matching unit 173 is connected to the antenna 103 via the transmission-reception switching unit 151 (FIG. 9).

The input matching unit 171 matches the impedance of the modulation-demodulation unit 152 (FIG. 9) with the input impedance of the FET 172. The output matching unit 173 matches between the output impedance of the FET 172 and the impedance of the antenna 103 (FIG. 9).

For example, the impedance at the other end b of the output matching unit 173 is 5Ω. In this case, the output matching unit 173 matches between 5Ω and the impedance of the FET 172. The output impedance of the FET 172 is designed to be as close as possible to 5Ω at the one end a of the output matching unit 173, in other words, the drain side of the FET 172. The output impedance of the FET 172 can be reduced by, for example, increasing the number of parallel FETs 172.

In a case where the FETs 172 are arranged in multiple parallel, affinity with a large power system can be enhanced. For example, the present technology can be applied to a system with high instantaneous power such as intermittent transmission. The closer the output impedance of the FET 172 is to 5Ω, the wider the band can be, and the lower the loss can be.

Although not illustrated, the high-frequency amplification unit 122 (FIG. 9) included in the high-frequency processing unit 102*b* is designed similarly to the high-frequency amplification unit 222, so that the impedance of the high-frequency amplification unit 122 can also be reduced.

Note that a linear system (grade A, B, AB, or C) or a switching system (grade D, E, F, or the like) can be applied to the high-frequency amplification unit 122 and the high-frequency amplification unit 222.

<Use of Circularly Polarized Antenna>

The antenna 103 of the master station 11 is a circularly polarized antenna. Although the antenna 103 of the master station 11 can be a linearly polarized antenna, it is possible to more reliably communicate with the slave station 21 by using a circularly polarized antenna.

Figure 12:
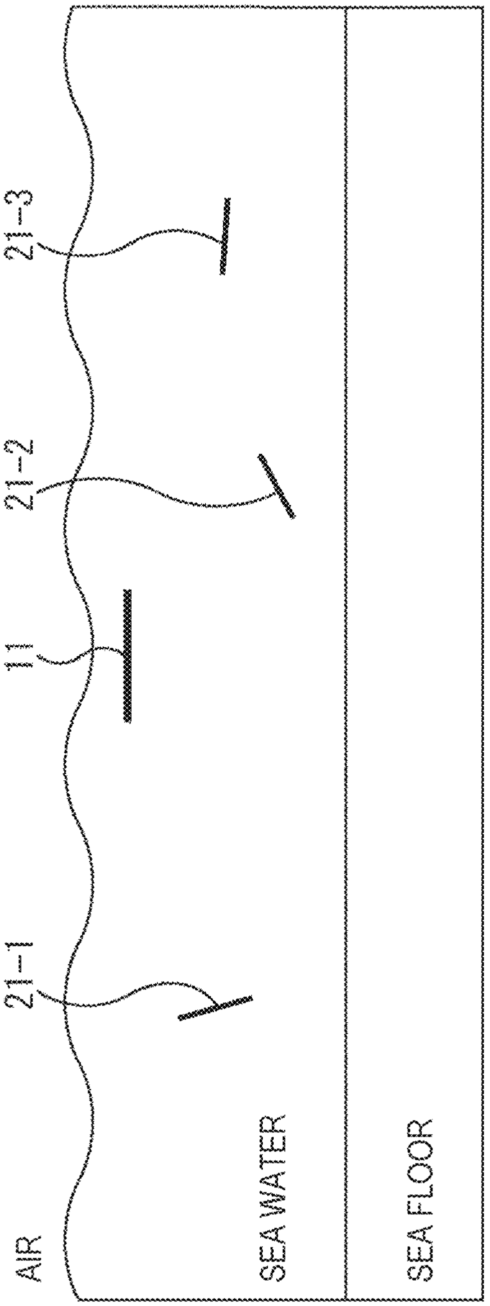
FIG. 12 is a diagram for describing a positional relationship of antennas in a case of linearly polarized waves.

The electric field strength in a case where the antenna 103 of the master station 11 is a linearly polarized antenna will be described with reference to FIGS. 12 and 13. FIG. 12 is a diagram illustrating directions of the antennas 103 of the master station 11 and the antennas 204 of the slave station 21 in a pseudo manner. In the drawing, a horizontal direction is an x-axis direction, a depth direction is a y-axis direction, and a vertical direction is a z-axis direction.

The antenna 103 of the master station 11 and the antenna 204 of the slave station 21 are linearly polarized antennas in the x direction. Since the master station 11 and the slave station 21 are installed in sea water, there is a possibility that the positional relationship between the antenna 103 of the master station 11 and the antenna 204 of the slave station 21 cannot be kept constant due to the influence of waves and the like. For example, as illustrated in FIG. 12, even if the antenna 103 of the master station 11 faces the x-axis direction, there is a possibility that the antenna 204 of each of the slave stations 21-1 to 21-3 faces a direction other than the x-axis direction.

Figure 13:
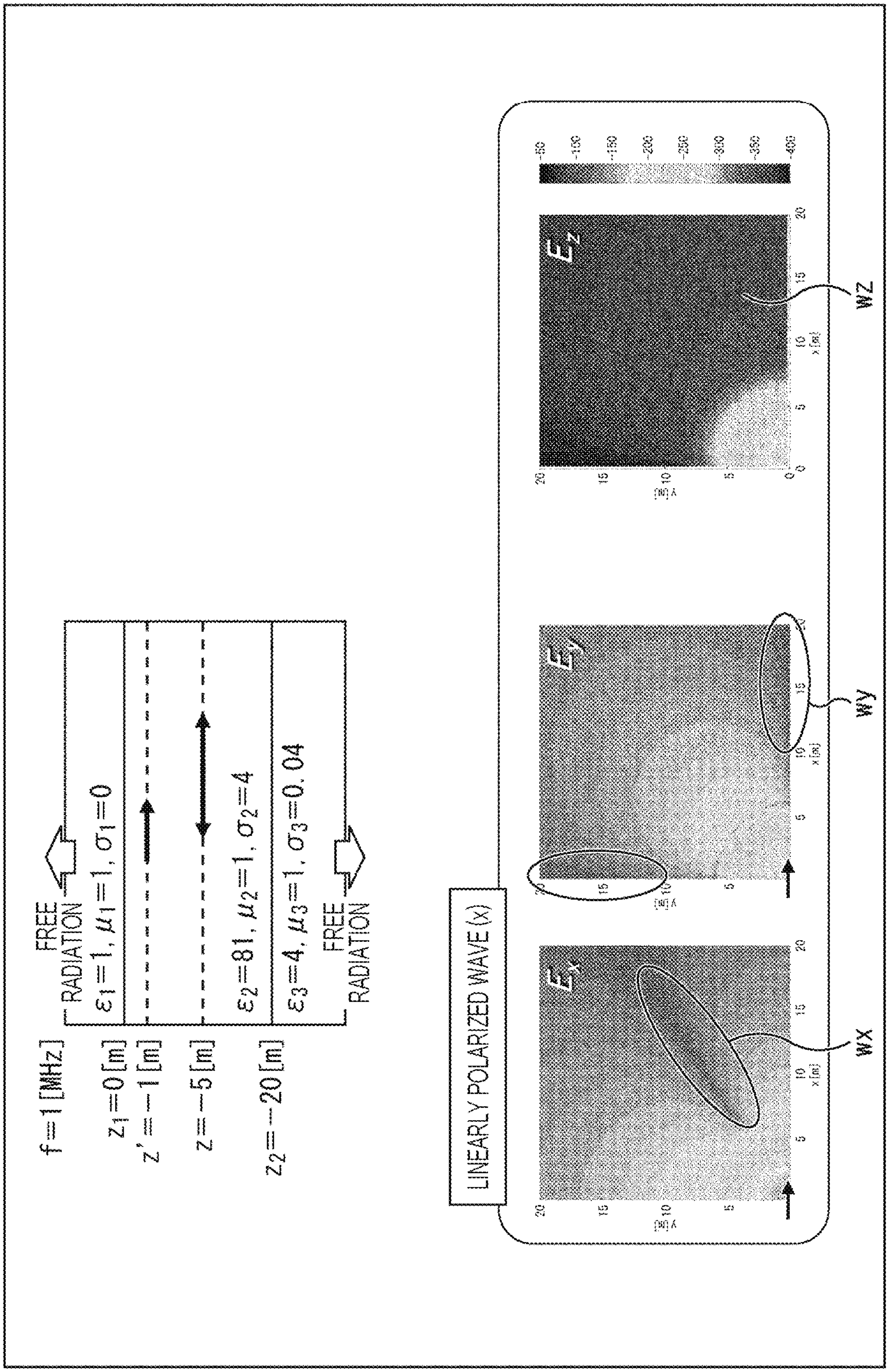
FIG. 13 is a diagram for describing electric field strength.

When the electric field strength of the antenna 103 of the master station 11 is simulated under the conditions as illustrated in the upper diagram of FIG. 13, a result as illustrated in the lower diagram of FIG. 13 is obtained. Referring to the upper diagram in FIG. 13, the antenna 103 of the master station 11 is installed at a position of 1 m (z'=−1 m) in the depth direction (z-axis direction) from the sea surface (z1=0). The lower diagram in FIG. 13 plots the electric field at a depth of 5 m (z=−5 m) from the sea surface of the antenna 103. The plot range is a range of x, y: 0 to 20 m.

The horizontal axis of each graph illustrated in the lower diagram of FIG. 13 represents a distance (0 to 20 m) in the x-axis direction, and the vertical axis represents a distance (0 to 20 m) in the y-axis direction. An electric field strength Ex of an x component is stronger as the distance from the antenna 103 is shorter (near 0 m), but is weaker as the distance from the antenna 103 is longer. A region wx surrounded by a line in the drawing is a region where the electric field strength Ex is particularly weak.

An electric field strength Ey of a y component is stronger as the distance from the antenna 103 is shorter (near 0 m), but is weaker as the distance from the antenna 103 is longer. A region wy surrounded by a line in the drawing is a region where the electric field strength Ey is particularly weak. An electric field strength Ez of a z component is strong in a case where the distance from the antenna 103 is short (near 0 m), but there is a region wz in which the electric field strength Ez is particularly weak when the distance from the antenna 103 is long.

From these results, it can be understood that the electric field strength Ez of the z component is weak as a whole, and there is a high possibility that the reception intensity is not sufficiently obtained in the z component. In the electric field strength Ex of the x component and the electric field strength Ey of the y component, it can be read that there are the region wx and the region wy in which the intensity is partially weak. For example, in a case where the polarized wave of the antenna 204 of the slave station 21 is located in the region wx, it is possible to receive the polarized wave by receiving the y component.

Since there is a component of which the strength is weakened as described above, the polarized wave of the antenna 204 of the slave station 21 can be received at any place as long as the slave station 21 and the master station 11 can be fixed so that the polarized wave can be received with the stronger component (the x component or the y component). However, it is assumed that there are many use cases where the posture of the slave station 21 is unstable, and it is assumed that it is difficult to fix the position of the antenna 204 of the slave station 21. For this reason, in a case where the orientation of the antenna 204 of the slave station 21 is located in the region wx or the region wy where the strength is weak, there is a possibility that reception cannot be performed in the master station 11.

Figure 14:
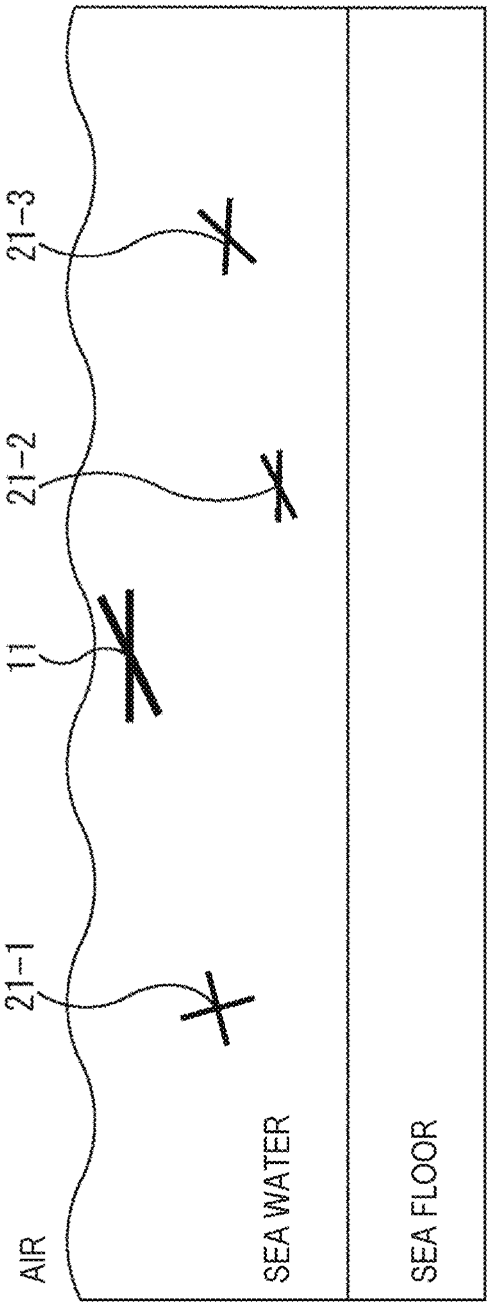
FIG. 14 is a diagram for describing a positional relationship of antennas in a case of circularly polarized waves.

The electric field strength in a case where the antenna 103 of the master station 11 is a circularly polarized antenna will be described with reference to FIGS. 14 and 15. Similarly to FIG. 12, FIG. 14 is a diagram illustrating the orientation of the antenna 103 of the master station 11 and the antenna 204 of the slave station 21 in a pseudo manner. Both the antenna 103 of the master station 11 and the antenna 204 of the slave station 21 are circularly polarized antennas. It is assumed that the antenna 103 of the master station 11 is fixed by circularly polarized waves of the x and y planes.

Figure 15:
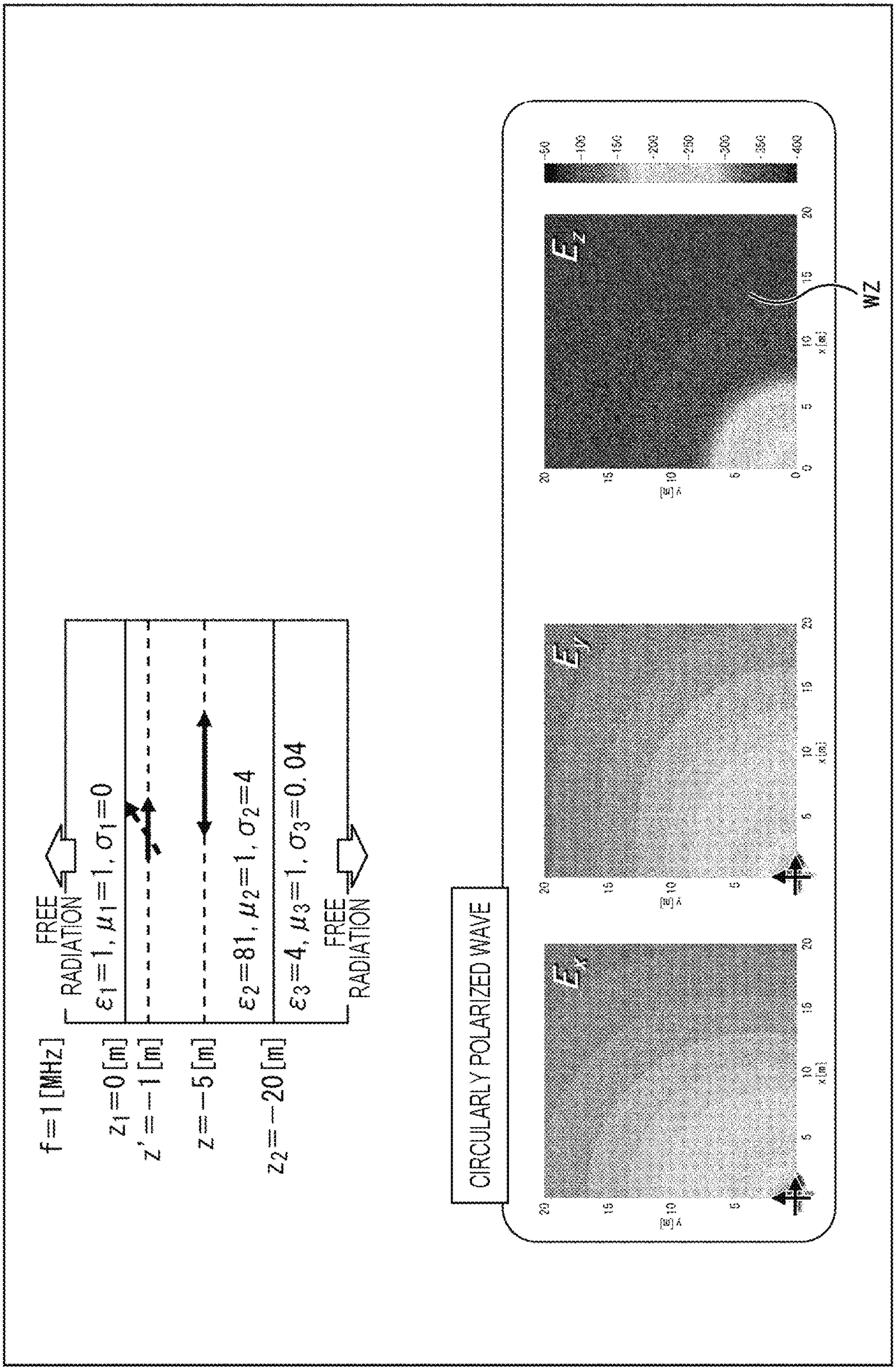
FIG. 15 is a diagram for describing electric field strength.

When the electric field strength of the antenna 103 of the master station 11 is simulated under the conditions illustrated in the upper diagram of FIG. 15 similarly to the conditions illustrated in the upper diagram of FIG. 13, a result illustrated in the lower diagram of FIG. 15 is obtained. Referring to the upper diagram in FIG. 15, the antenna 103 of the master station 11 is installed at a position of 1 m (z'=−1 m) in the depth direction (z-axis direction) from the sea surface (z1=0). The lower diagram in FIG. 15 plots the electric field at a depth of 5 m (z=−5 m) from the sea surface of the antenna 103. The plot range is a range of x, y: 0 to 20 m.

Referring to each graph illustrated in the lower diagram of FIG. 15, it can be understood that the electric field strength Ex of the x component is stronger as the distance from the antenna 103 is shorter (near 0 m) but is weaker as the distance from the antenna 103 is longer, which is the same as in a case of the linearly polarized antenna, but it is different from a case of the linearly polarized antenna in that there is no region wx and the electric field strength Ex is better over the entire region.

The same applies to the y component, and it can be read that the region wy where the electric field strength Ey is weak is eliminated, and the electric field strength Ey is improved over the entire region. Even in a case where the electric field strength Ez of the z component is circularly polarized, it can be read that the electric field strength Ez is weak and is not improved except in the vicinity of the antenna 103 as in the case of the linearly polarized antenna.

From these results, it can be understood that both the x component and the y component of the electric field can be received in any direction by using the antenna 103 of the master station 11 as a circularly polarized antenna.

For this reason, the antenna 103 of the master station 11 is formed by a circularly polarized antenna.

As described with reference to FIG. 15, the antenna 103 of the master station 11 is a circularly polarized antenna, so that the x component and the y component can be received in any direction. However, there is a possibility that the z component is not improved, and in a case where, for example, the antenna 204 of the slave station 21 is a single linearly polarized wave and faces the z-axis direction, the reception strength of the signal from the slave station 21 may be weakened on the master station 11 side.

The antenna 204 of the slave station 21 can be improved by using circularly polarized waves instead of single linearly polarized waves. The antenna 204 of the slave station 21 is a linearly polarized antenna, but can be improved by having a diversity configuration. The antenna 204 of the antenna 204 of the slave station 21 can also be improved by using a circularly polarized antenna and having a diversity configuration.

The antenna 103 of the master station 11 can also be a circularly polarized antenna and have a diversity configuration, and with such a configuration, it is possible to stably receive a signal from the slave station 21 regardless of the posture of the slave station 21.

The antenna 103 of the master station 11 and/or the antenna 204 of the slave station 21 is circularly polarized antennas and are configured to have diversity, so that a configuration in which reception can be performed more stably will be described. A left-handed component (LHC) and a right-handed component (RHC) in a case where the antenna 103 of the master station 11 is a circularly polarized antenna will be considered.

The direct wave propagating through the water reaches the master station 11 with the polarization unchanged, whereas the lateral wave propagating through the air (above the sea surface) reaches the master station 11 with the polarization reversed. As described with reference to FIG. 3, since the lateral wave reaches farther than the direct wave, the right-handed component (RHC) by the direct wave is strong in the vicinity immediately below the master station 11, but the left-handed component (LHC) by the lateral wave is strong in a place away from the master station 11.

Since there is a difference in strength between the level-rotation component (LHC) and the right-rotation component (RHC) as described above, there is a possibility that the master station 11 side changes which component is better for reception. Since the posture of the slave station 21 is also unstable, there is a possibility that the left-polarized component/right-polarized component of the antenna 204 itself of the slave station 21 changes.

Accordingly, the antenna 103 of the master station 11 is a circularly polarized antenna or an antenna having a circularly polarized diversity configuration. The antenna 204 of the slave station 21 is an antenna having a linearly polarized diversity configuration, a circularly polarized antenna, or a circularly polarized diversity configuration. Note that, here, the antenna 204 of the slave station 21 is used to transmit and receive data to and from the master station 11 or transmit data to the master station 11. Even in a case of a configuration in which the slave station 21 transmits data to the master station 11 (configuration in which reception is not performed), the antenna 204 can be an antenna having a linearly polarized diversity configuration, a circularly polarized antenna, or a circularly polarized diversity configuration.

In a case where an antenna having a linearly polarized diversity configuration is employed, a diversity configuration of two-axis polarized wave may be employed, or a diversity configuration of three-axis polarized wave may be employed.

<Configurations of Master Station and Slave Station in Diversity Configuration>

Figure 16:
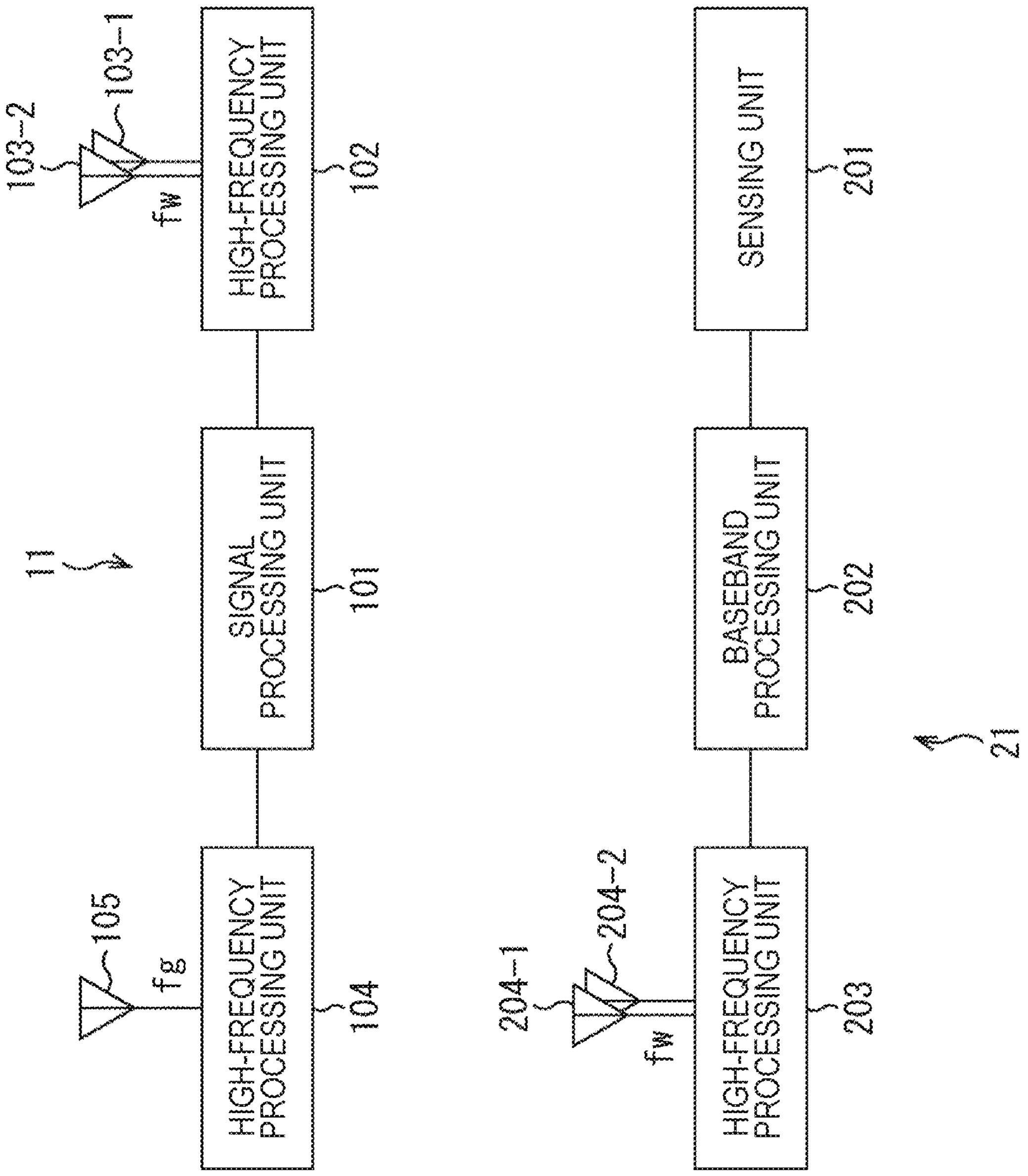
FIG. 16 is a diagram illustrating another configuration example of the master station and the slave station.

FIG. 16 illustrates a configuration example of the master station 11 and a configuration example of the slave station 21 in a case of the diversity configuration. In the master station 11, an antenna 103-1 and an antenna 103-2 are provided in the high-frequency processing unit 102 on the side where communication is performed with the slave station 21. In the slave station 21, an antenna 204-1 and an antenna 204-2 are provided in the high-frequency processing unit 203 on the side where communication is performed with the master station 11.

Figure 17:
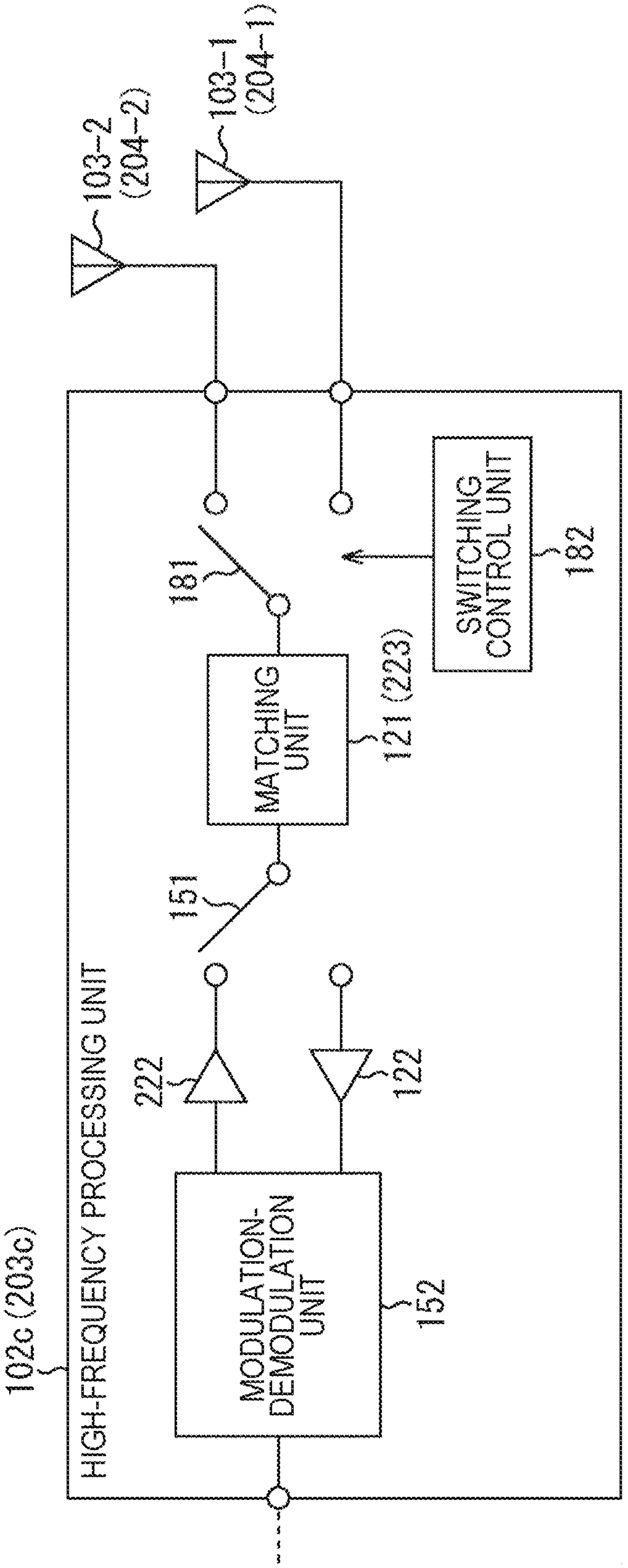
FIG. 17 is a diagram illustrating another configuration example of the high-frequency processing unit.

FIG. 17 is a diagram illustrating a configuration example of a high-frequency processing unit 102*c* (referred to as a third embodiment) of the master station 11. The high-frequency processing unit 102*c* illustrated in FIG. 17 has a configuration in which a polarization switching unit 181 and a switching control unit 182 are added to the high-frequency processing unit 102*c* illustrated in FIG. 9.

One of the polarization switching units 181 is connected to the antenna 103-1, and the other is connected to the antenna 103-2. The antenna 103-1 and the antenna 103-2 are circularly polarized antennas, but are capable of transmitting and receiving different polarized waves.

In a case of receiving a signal, the switching control unit 182 compares the power of the signal received by the antenna 103-1 with the power of the signal received by the antenna 103-2, and switches the polarization switching unit 181 so that a signal with higher power is supplied to the matching unit 121.

In a case of transmitting a signal, the switching control unit 182 selects a polarization having higher power at the time of reception, and switches the polarization switching unit 181 to the antenna 103-1 or the antenna 103-2 of the selected polarization.

The configuration of the high-frequency processing unit 102*c* illustrated in FIG. 17 can also be applied to a configuration of a high-frequency processing unit 203*c* of the slave station 21. The high-frequency processing unit 203*c* illustrated in FIG. 17 includes an antenna 204-1 and an antenna 204-2.

The antenna 204-1 and the antenna 204-2 are circularly polarized antennas, and are polarization diversity antennas capable of transmitting and receiving different polarized waves. Alternatively, the antenna 204-1 and the antenna 204-2 are linearly polarized antennas, and are polarization diversity antennas capable of transmitting and receiving polarized waves orthogonal to each other.

In a case where signals are transmitted from the antenna 204-1 and the antenna 204-2, the signals may be transmitted from both the antennas 204 at the same timing, or identical signals may be transmitted with different polarizations at shifted times.

<Configuration of High-Frequency Processing Unit in Fourth Embodiment>

Figure 18:
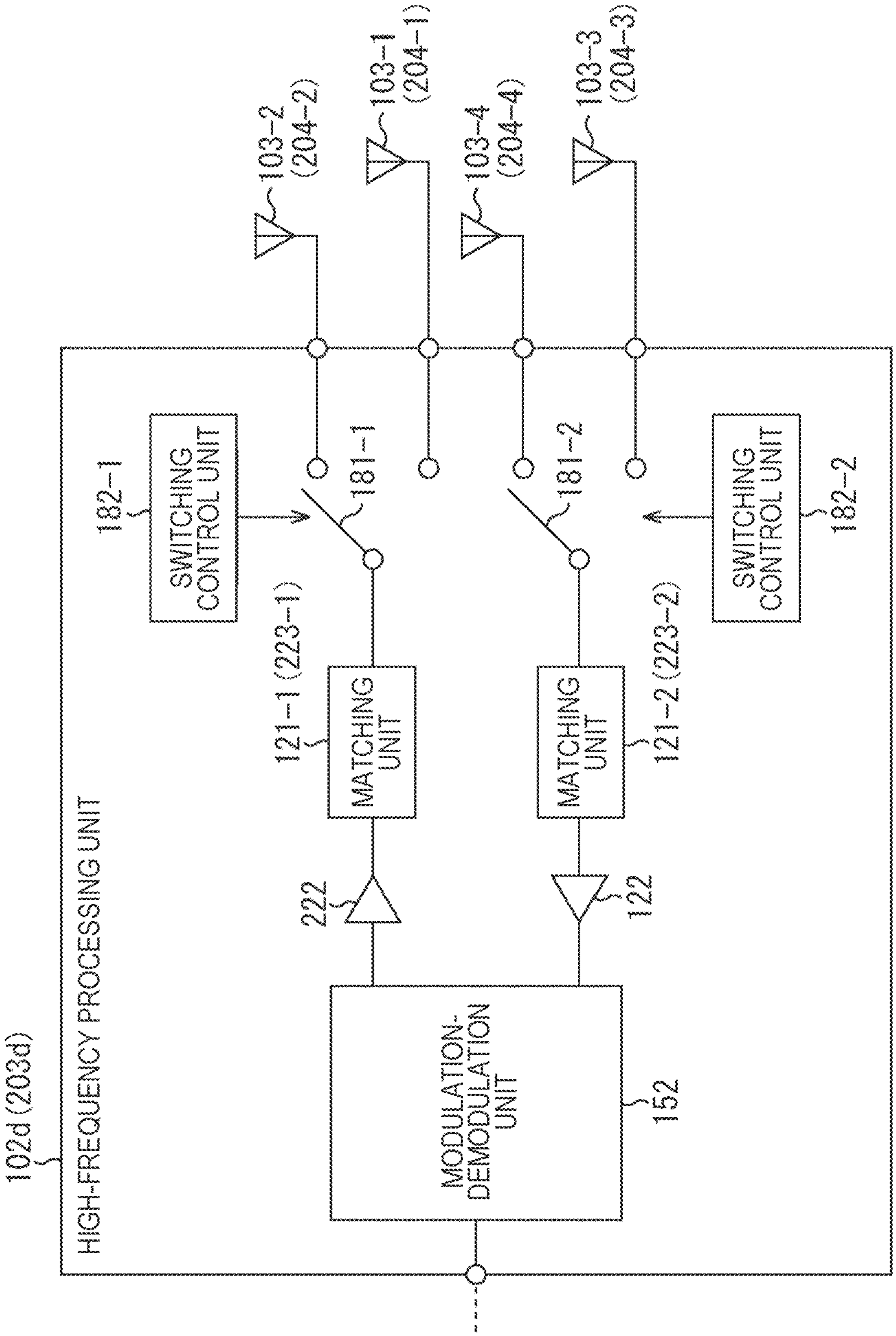
FIG. 18 is a diagram illustrating another configuration example of the high-frequency processing unit.

FIG. 18 is a diagram illustrating a configuration example of a high-frequency processing unit 102*d* of the master station 11 according to the fourth embodiment. The high-frequency processing unit 102*d* illustrated in FIG. 18 is different from the high-frequency processing unit 102*d* illustrated in FIG. 17 in including each of a transmission antenna and a reception antenna.

The high-frequency processing unit 102*d* illustrated in FIG. 18 includes the antenna 103-1 and the antenna 103-2 as diversity antennas for transmission, and includes an antenna 103-3 and an antenna 103-4 as diversity antennas for reception. The antennas 103-1 to 103-4 are circularly polarized antennas. Alternatively, the transmission antenna 103 and the reception antenna 103 may be antennas of different polarizations such that the antenna 103-1 and the antenna 103-2 are antennas for linear detection and the antenna 103-3 and the antenna 103-4 are antennas for circular detection.

The antenna 103-1 and the antenna 103-2 are connected to the matching unit 121-1 via a polarization switching unit 181-1. The antenna 103-3 and the antenna 103-4 are connected to the matching unit 121-2 via a polarization switching unit 181-2.

In a case of transmitting a signal, the switching control unit 182-1 selects a polarization having higher power at the time of reception, and switches the polarization switching unit 181-1 to the antenna 103-1 or the antenna 103-2 of the selected polarization.

In a case of receiving a signal, the switching control unit 182-2 compares the power of the signal received by the antenna 103-3 with the power of the signal received by the antenna 103-4, and switches the polarization switching unit 181-2 such that a signal with higher power is supplied to the matching unit 121-2.

The configuration of the high-frequency processing unit 102*d* illustrated in FIG. 18 can also be applied to a configuration of a high-frequency processing unit 203*d* of the slave station 21. The high-frequency processing unit 203*d* illustrated in FIG. 18 includes an antenna 204-1 and an antenna

204-2 as diversity antennas for transmission, and includes an antenna 204-3 and an antenna 204-4 as diversity antennas for reception.

The antenna 204-1 and the antenna 204-2 are connected to the matching unit 223-1 via the polarization switching unit 181-1. The antenna 204-3 and the antenna 204-4 are connected to the matching unit 223-2 via the polarization switching unit 181-2.

In a case of transmitting a signal, the switching control unit 182-1 selects a polarization having higher power at the time of reception, and switches the polarization switching unit 181-1 to the antenna 204-1 or the antenna 204-2 of the selected polarization.

In a case of receiving a signal, the switching control unit 182-2 compares the power of the signal received by the antenna 204-3 with the power of the signal received by the antenna 204-4, and switches the polarization switching unit 181-2 such that a signal with higher power is supplied to the matching unit 121-2.

Each of the antenna 204-1 and the antenna 204-2 is a circularly polarized antenna, and is a polarization diversity antenna capable of transmitting different polarized waves. Each of the antenna 204-3 and the antenna 204-4 is a circularly polarized antenna, and is a polarization diversity antenna capable of receiving different polarized waves.

Alternatively, the antenna 204-1 and the antenna 204-2 are linearly polarized antennas, and are polarization diversity antennas capable of transmitting polarized waves orthogonal to each other. The antenna 204-3 and the antenna 204-4 are linearly polarized antennas, and are polarization diversity antennas capable of receiving polarized waves orthogonal to each other.

Alternatively, the transmission antenna and the reception antenna may be formed by antennas of different polarizations such that the antenna 204-1 and the antenna 204-2 are linearly polarized antennas and the antenna 204-3 and the antenna 204-4 are circularly polarized antennas.

In a case where signals are transmitted from the antenna 204-1 and the antenna 204-2, the signals may be transmitted from both the antennas 204 at the same timing, or identical signals may be transmitted with different polarizations at shifted times.

<Configuration of High-Frequency Processing Unit in Fifth Embodiment>

Figure 19:
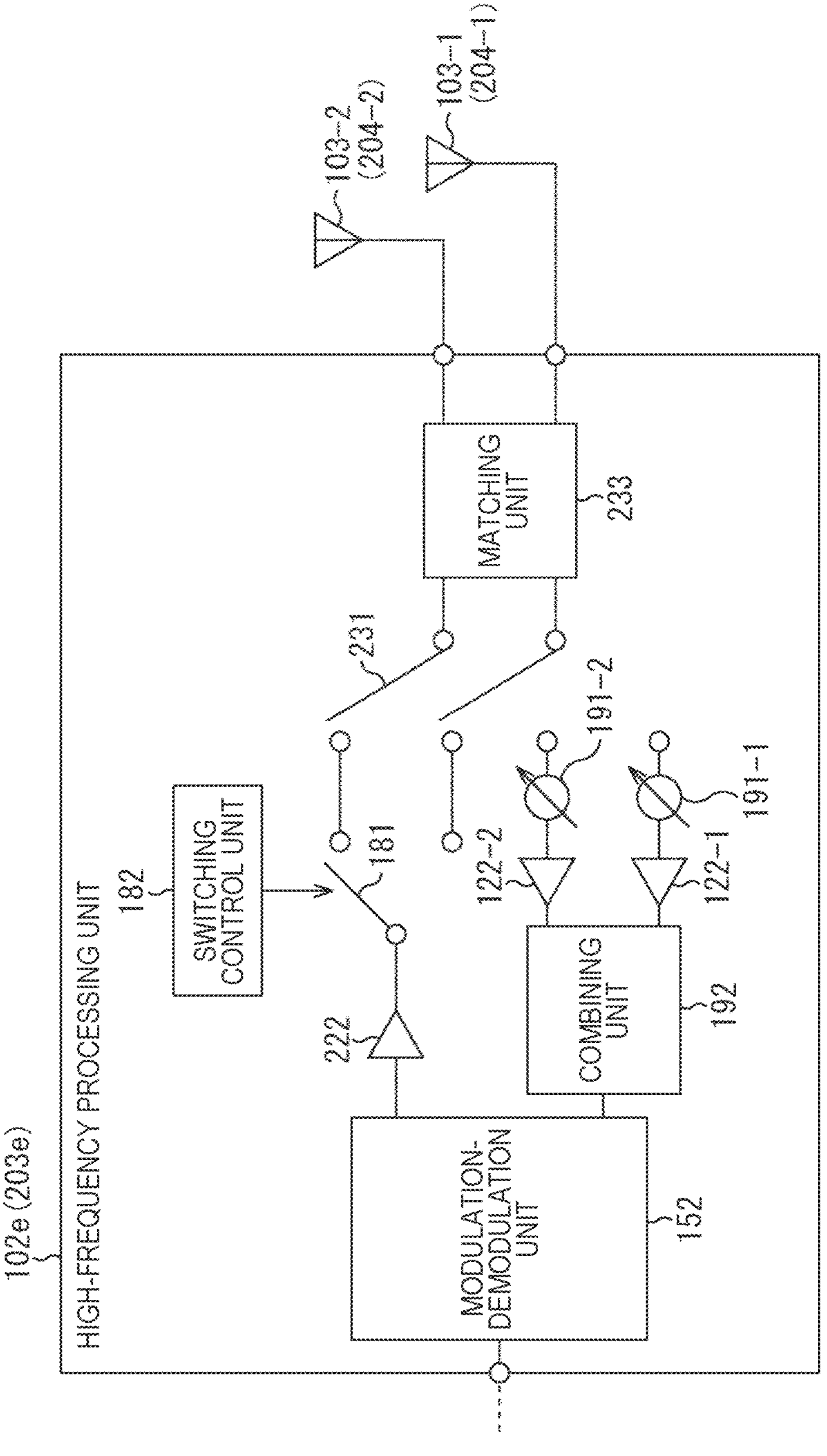
FIG. 19 is a diagram illustrating another configuration example of the high-frequency processing unit.

FIG. 19 is a diagram illustrating a configuration example of a high-frequency processing unit 102*e* of the master station 11 according to a fifth embodiment. The high-frequency processing unit 102*e* illustrated in FIG. 19 includes a combining unit 192 that combines signals received by the antenna 103-1 and the antenna 103-2, and a matching unit 233 that matches signals transmitted and received by the antenna 103-1 and the antenna 103-2.

Signals received by the antenna 103-1 and the antenna 103-2 are supplied to the transmission-reception switching unit 231 via the matching unit 233. At the time of signal reception, the transmission-reception switching unit 231 is switched to a phase shifter 191 side. The signal received by the antenna 103-1 is supplied to the phase shifter 191-1, and the signal received by the antenna 103-2 is supplied to the phase shifter 191-2.

The phase amount of the signal supplied to the phase shifter 191-1 is adjusted and supplied to the high-frequency amplification unit 122-1. The phase amount of the signal supplied to the phase shifter 191-2 is adjusted and supplied to the high-frequency amplification unit 122-2. The phase shifter 191-1 and the phase shifter 191-2 match phases of the signal received by antenna 103-1 and the signal received by antenna 103-2.

The high-frequency amplification unit 122-1 and the high-frequency amplification unit 122-2 amplify the input signals to adjust the gain.

The signal amplified by the high-frequency amplification unit 122-1 and the signal amplified by the high-frequency amplification unit 122-2 are supplied to the combining unit 192. The combining unit 192 combines the two supplied signals. By the processing of the high-frequency amplification unit 122 and the combining unit 192, combining in which the gain is adjusted to maximize the S/N ratio is performed.

At the time of signal transmission, the transmission-reception switching unit 231 is switched to the polarization switching unit 181 side. In a case of transmitting a signal, the switching control unit 182 selects a polarization having higher power at the time of reception, and switches the polarization switching unit 181 to the antenna 103-1 or the antenna 103-2 of the selected polarization. The high-frequency amplification unit 222 amplifies a signal modulated by the modulation-demodulation unit 152 using a predetermined modulation method. The amplified signal is transmitted by the selected antenna 103-1 or antenna 103-2.

Each of the antenna 103-1 and the antenna 103-2 of the master station 11 is a circularly polarized antenna. The high-frequency processing unit 102*e* illustrated in FIG. 19 has a configuration in a case of circularly polarized polarization diversity.

Note that although the high-frequency processing unit 102*e* illustrated in FIG. 19 is illustrated to include the high-frequency amplification unit 122, the high-frequency amplification unit 122 may be deleted. That is, it is also possible to employ a configuration of equal gain combining diversity in which only phases are matched.

The high-frequency processing unit 102*e* illustrated in FIG. 19 can include a transmission antenna and a reception antenna separately as does the high-frequency processing unit 102*e* illustrated in FIG. 18.

The configuration of the high-frequency processing unit 102*e* illustrated in FIG. 19 can also be applied to a configuration of a high-frequency processing unit 203*e* of the slave station 21. In the high-frequency processing unit 203*e* of the slave station 21, the signals received by the antenna 204-1 and the antenna 204-2 are supplied to the phase shifter 191-1 and the phase shifter 191-2, respectively, via the matching unit 233 and the transmission-reception switching unit 231.

The phase amounts of the signals supplied to the phase shifter 191-1 and the phase shifter 191-2 are adjusted, and the signals are supplied to the high-frequency amplification unit 122-1 and the high-frequency amplification unit 122-2, respectively. The gain is adjusted by amplifying the signal in each of the high-frequency amplification unit 122-1 and the high-frequency amplification unit 122-2. The signal amplified by the high-frequency amplification unit 122-1 and the signal amplified by the high-frequency amplification unit 122-2 are supplied to the combining unit 192 and combined. By the processing of the high-frequency amplification unit 122 and the combining unit 192, combining in which the gain is adjusted to maximize the S/N ratio is performed.

At the time of signal transmission, the transmission-reception switching unit 231 is switched to the polarization switching unit 181 side. In a case of transmitting a signal, the switching control unit 182 selects a polarization having higher power at the time of reception, and switches the polarization switching unit 181 to the antenna 204-1 or the antenna 204-2 of the selected polarization. The high-frequency amplification unit 222 amplifies a signal modulated by the modulation-demodulation unit 152 by a predetermined modulation method. The amplified signal is transmitted by the selected antenna 204-1 or antenna 204-2.

The antenna 204 of the slave station 21 is a linearly polarized antenna or a circularly polarized antenna. The antenna 204-1 and the antenna 204-2 of the slave station 21 can each be a linearly polarized antenna such as a dipole antenna, and can each be an antenna in which the two sets of antennas 204 are mounted in an orthogonal state. Alternatively, each of the antenna 204-1 and the antenna 204-2 of the slave station 21 can be a circularly polarized antenna, and the high-frequency processing unit **203*e*** may have a configuration of circularly polarized polarization diversity.

Note that although the high-frequency processing unit **203*e* illustrated in FIG. 19 is illustrated to include the high-frequency amplification unit 122, the high-frequency amplification unit 122** may be deleted. That is, it is also possible to employ a configuration of equal gain combining diversity in which only phases are matched.

The high-frequency processing unit **203*e* illustrated in FIG. 19 can include a transmission antenna and a reception antenna separately as does the high-frequency processing unit 203*e* illustrated in FIG. 18**.

<Shape of Antenna>

Figure 20:
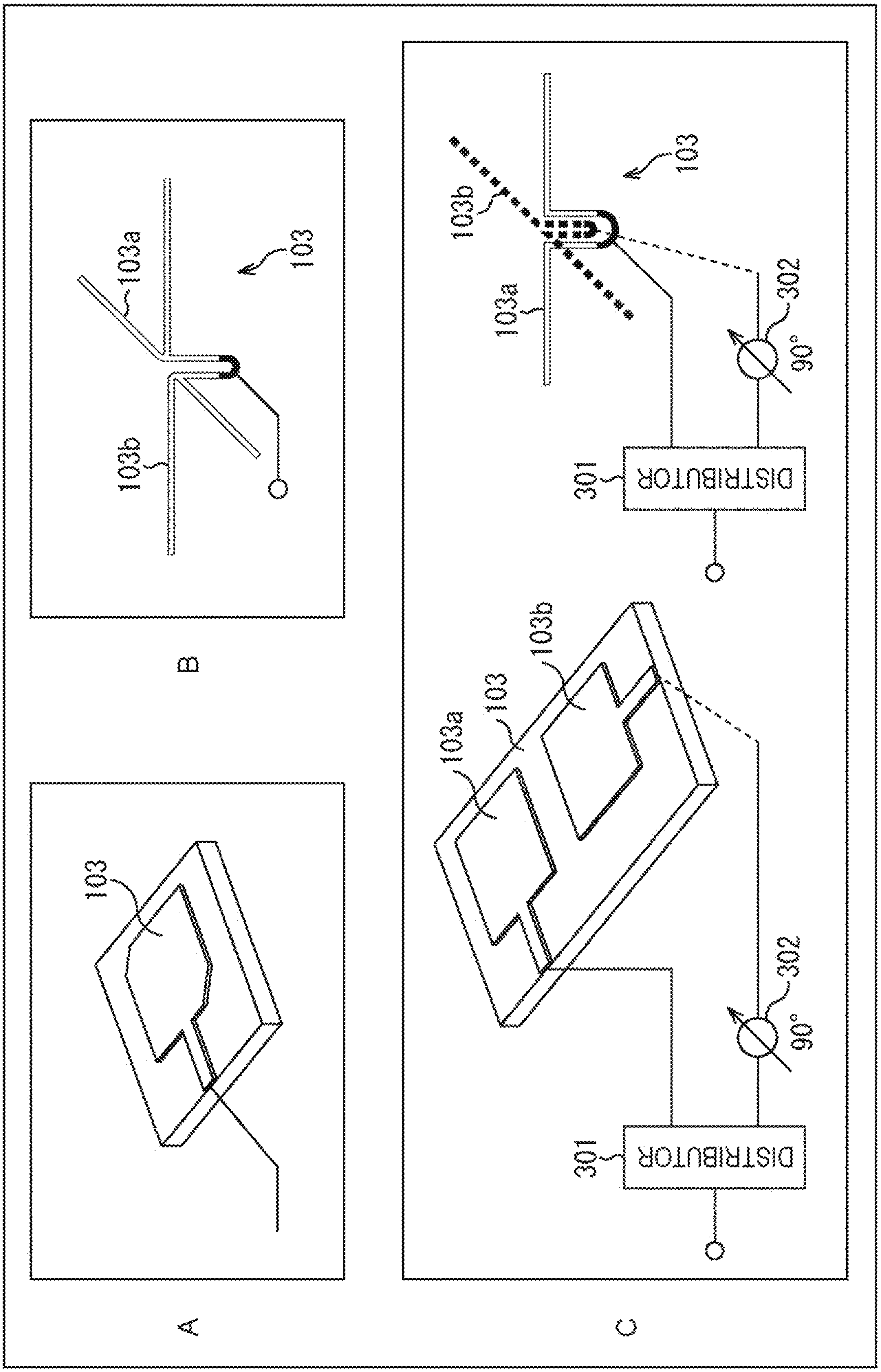
FIG. 20 is a diagram for describing shapes of antennas.

As the circularly polarized antenna 103 of the master station 11, a circularly polarized microstrip antenna can be used as illustrated in A of FIG. 20. The microstrip antenna is a planar antenna including a dielectric substrate, and a radiation element and a ground conductor plate printed and wired on both surfaces of the dielectric substrate. The radiating element of such a microstrip antenna may be circularly polarized by notching or the like, and used as the circularly polarized antenna 103 described above.

As the circularly polarized antenna 103 of the master station 11, a cross dipole antenna can also be used as illustrated in B of FIG. 20. An antenna configured such that a difference is provided between the lengths of the element **103*a* and the element 103*b* orthogonal to each other and a phase difference of 90° occurs in the orthogonal polarized wave may be used as the circularly polarized antenna 103** described above.

As illustrated in C of FIG. 20, the circularly polarized antenna 103 of the master station 11 can also be an antenna in which circularly polarized waves are implemented by feeding two sets of linearly polarized antennas **103*a* and 103*b* orthogonal to each other with a phase difference of 90°. Each of the antenna 103*a* and the antenna 103*b* illustrated in C of FIG. 20** is a linearly polarized microstrip antenna.

The signal supplied to a distributor 301 is supplied to the antenna **103*a* and the antenna 103*b*. The signal supplied to the antenna 103*b* is a signal whose phase difference is shifted by 90° by the phase shifter 302**.

The configurations of the circularly polarized antennas 103 illustrated in A to C of FIG. 20 can also be applied to a case where the antenna 204 of the slave station 21 is a circularly polarized antenna.

The circularly polarized antenna may have a configuration other than that exemplified here.

The power necessary for the operation of each of the master station 11 and the slave station 21 described above can be configured such that, for example, a solar power generator is provided in the master station 11 and the slave station 21 and the power is supplied from the solar power generator. As a method of supplying power to the master station 11 or the slave station 21, contactless power supply can be applied.

In the present specification, the system represents the entire apparatus including a plurality of apparatuses. Note that the effects described in the present specification are merely examples and are not limited, and there may be other effects.

Note that the embodiments of the present technology are not limited to the above-described embodiments, and various changes can be made without departing from the gist of the present technology.

Note that the present technology can also have the following configuration.

(1)

A communication device including:

a first antenna connected to a communication network in a liquid; and a first signal processing unit that processes at least one of a signal received by the first antenna or a signal transmitted by the first antenna, in which the first antenna is a circularly polarized antenna.

(2)

The communication device according to (1) above, further including:

a second antenna connected to a communication network in gas; and a second signal processing unit that processes at least one of a signal received by the second antenna or a signal transmitted by the second antenna.

(3)

The communication device according to (1) above, further including:

a sensing unit that senses information in a liquid, in which the first signal processing unit transmits the information sensed by the sensing unit to another communication device through the first antenna.

(4)

The communication device according to (1) above, in which the first antenna receives a signal from another communication device in a liquid, and the first signal processing unit amplifies the received signal and further transmits the signal amplified to another communication device using the first antenna.

(5)

The communication device according to any one of (1) to (4) above, in which the first antenna is a polarization diversity antenna with two circularly polarized antennas.

(6)

The communication device according to any of (1), (3), or (4) above, in which the first antenna is a polarization diversity antenna with the circularly polarized antenna or two linearly polarized antennas.

(7)

The communication device according to (5) or (6) above, in which identical signals are transmitted with different polarizations at shifted times.

(8)

The communication device according to any one of (1) to (7) above, in which the first signal processing unit includes a matching unit that matches an impedance of the first antenna with an impedance in the first signal processing unit, an amplification unit that amplifies the signal received or transmitted by the first antenna, and a modulation-demodulation unit that modulates or demodulates the signal received or transmitted by the first antenna.

(9)

The communication device according to (8) above, in which an impedance of the first antenna and an impedance in the first signal processing unit are 10Ω or less.

(10)

The communication device according to (2) above, in which the second antenna and the second signal processing unit connected to a land-based communication network or a satellite communication network are provided for each communication network.

(11)

A communication system including a first communication device and a second communication device, in which the first communication device includes a first antenna connected to the second communication device in a liquid, and a first signal processing unit that processes a signal from the second communication device received by the first antenna, the second communication device includes a second antenna connected to the first communication device in a liquid, and a second signal processing unit that processes a signal to be transmitted to the first communication device by the second antenna, the first antenna is a circularly polarized antenna, and the second antenna is a circularly polarized or linearly polarized antenna.

(12)

The communication system according to (11) above, in which the first antenna is a polarization diversity antenna with two circularly polarized antennas.

(13)

The communication system according to (11) above, in which the second antenna is a polarization diversity antenna with two circularly polarized antennas or two linearly polarized antennas.

(14)

The communication system according to any one of (11) to (13) above, in which the second communication device forms an ad-hoc network.

(15)

The communication system according to any one of (11) to (14) above, in which transmission of the signal from the second communication device to the first communication device is intermittent transmission.

(16)

The communication system according to any one of (11) to (15) above, in which the first communication device includes a third antenna and a third signal processing unit connected to a land-based communication network or a satellite communication network for each communication network, and transmits a signal from the second communication device to the land-based communication network or the satellite communication network.

REFERENCE SIGNS LIST

1 Communication system
11 Master station
12, 13 Communication station
14 Satellite
15 Relay station
21 Slave station
31 Transmitter
32 Receiver
101 Signal processing unit
102 High-frequency processing unit
103 Antenna
104 High-frequency processing unit
105 Antenna
121 Matching unit
122 High-frequency amplification unit
123 Demodulation unit
151 Transmission-reception switching unit
152 Modulation-demodulation unit
171 Input matching unit
172 FET
173 Output matching unit
181 Polarization switching unit
182 Switching control unit
191 Phase shifter
192 Combining unit
201 Sensing unit
202 Baseband processing unit
203 High-frequency processing unit
204 Antenna
221 Modulation unit
222 High-frequency amplification unit
223 Matching unit
231 Transmission-reception switching unit
233 Matching unit
301 Distributor
302 Phase shifter

The invention claimed is:

1. A communication device, comprising:

a body configured to float on a liquid;

a first antenna connected to the body and configured to be submerged in the liquid when the body is floating on the liquid, wherein the first antenna is wirelessly connected to a first communication network submerged in the liquid; and a first signal processing circuit connected to the first antenna and that processes a first signal, wherein the first signal is a radio frequency (RF) signal that is received from the first communication network that is submerged in the liquid by the first antenna or that is transmitted to the first communication network that is submerged in the liquid by the first antenna, wherein the first antenna comprises two circularly polarized antennas, and wherein the communication device further comprises:

a first polarization switching circuit connected to a first of the two circularly polarized antennas;

a second polarization switching circuit connected to a second of the two circularly polarized antennas;

a switching control circuit connected to the first and second polarization switching circuits, wherein the switching control circuit switches the first signal that is transmitted or received between the first and second polarization switching circuits based on one of two received signals having a polarization having higher power at a time of reception.

2. The communication device according to claim 1, further comprising:

a second antenna connected to the body and configured to be exposed to the atmosphere, wherein the second antenna is wirelessly connected to a second communication network in or above the atmosphere; and a second signal processing circuit connected to the second antenna and that processes a second signal, wherein the second signal is a second RF signal that is received from the second communication network located in or above the atmosphere by the second antenna or that is transmitted to the second communication network located in or above the atmosphere by the second antenna.

3. The communication device according to claim 2, wherein the second antenna and the second signal processing circuit are wirelessly connected to a land-based communication network or a satellite communication network that are provided for each communication network.

4. The communication device according to claim 1, further comprising:

a sensing circuit connected to the first signal processing circuit and that senses information in the liquid, wherein the first signal processing circuit transmits the information sensed by the sensing circuit to another communication device through the first antenna.

5. The communication device according to claim 1, wherein the first antenna receives a third signal from another communication device that is submerged in the liquid, and wherein the first signal processing circuit amplifies the received third signal and further transmits the amplified third signal to another communication device using the first antenna.

6. The communication device according to claim 1, wherein each of the two circularly polarized antennas comprises two linearly polarized antennas configured to operate as a circularly polarized antenna.

7. The communication device according to claim 1, wherein identical signals are transmitted via the two linearly polarized antennas with different polarizations at shifted times.

8. The communication device according to claim 1, wherein the first signal processing circuit includes:

a matching circuit connected to the first signal processing circuit and that matches an impedance of the first antenna with an impedance in the first signal processing circuit, an amplification circuit connected to the matching circuit that amplifies the first signal received or transmitted by the first antenna, and a modulation-demodulation circuit connected to the amplification circuit and the first antenna, and that modulates or demodulates the first signal received or transmitted by the first antenna.

9. The communication device according to claim 8, wherein an impedance of the first antenna and an impedance in the first signal processing circuit are 10Ω or less.

10. The communication device according to claim 1, wherein the RF signal that is transmitted or received comprises each of a lateral RF wave that propagates to the first communication network above a surface of the liquid and a direct RF wave that propagates to the first communication network below the surface of the liquid.

* * * * *